United States Patent [19]

Graham

[11] Patent Number: 5,393,130
[45] Date of Patent: Feb. 28, 1995

[54] METHOD OF SUPPLYING A HIGHER PRESSURE RESERVE AIR SUPPLY FOR AIR BRAKE SYSTEM

[76] Inventor: John M. Graham, 930 Peninsula Ave., #205, San Mateo, Calif. 94401

[21] Appl. No.: 258,133

[22] Filed: Jun. 10, 1994

Related U.S. Application Data

[60] Continuation of Ser. No. 52,598, Apr. 22, 1993, abandoned, which is a division of Ser. No. 916,652, Jul. 20, 1992, Pat. No. 5,255,961, which is a continuation-in-part of Ser. No. 754,775, Sep. 4, 1991, Pat. No. 5,154,491, which is a continuation-in-part of Ser. No. 606,386, Oct. 31, 1990, abandoned, which is a continuation-in-part of Ser. No. 497,932, Mar. 22, 1990, abandoned, which is a continuation-in-part of Ser. No. 430,755, Nov. 1, 1989, Pat. No. 4,973,107.

[51] Int. Cl.$^6$ ................................. B60T 15/20
[52] U.S. Cl. ........................ 303/57; 303/13; 303/85
[58] Field of Search ............ 303/13, 57, 64, 25, 303/85, 7, 11, 66, 6.01, 9, 9.61; 137/571

[56] References Cited

U.S. PATENT DOCUMENTS

| Re. 32,885 | 3/1989 | Graham | 303/9.76 |
|---|---|---|---|
| 3,003,822 | 10/1961 | McCarthy | 303/85 X |
| 3,032,293 | 5/1962 | Fondén et al. | 303/85 X |
| 3,065,997 | 11/1962 | Frankhouser et al. | |
| 3,107,126 | 10/1963 | Valentine | 303/13 |
| 3,508,469 | 4/1970 | Williams | |
| 3,712,181 | 1/1973 | Swander, Jr. et al. | 188/170 |
| 3,729,070 | 4/1973 | Le Marchand | 188/170 X |
| 3,895,695 | 7/1975 | Hunter | 188/170 X |
| 4,003,605 | 1/1977 | Fannin | 303/13 X |
| 4,003,606 | 1/1977 | Plantan | 303/13 X |
| 4,785,718 | 11/1988 | Hata et al. | 92/29 |

FOREIGN PATENT DOCUMENTS

| 2258994 | 8/1975 | France |
| 1440511 | 6/1976 | United Kingdom |

*Primary Examiner*—Robert J. Oberleitner
*Assistant Examiner*—Poon, Peter M.
*Attorney, Agent, or Firm*—Graham & James

[57] ABSTRACT

Air is supplied to an air brake supply tank on a wheeled vehicle by supplying air from an air compressor to a primary tank at an elevated pressure, fluidly coupling the primary tank to a supply tank, and reducing the pressure of the air supplied to the supply tank to a level suitable for use by the vehicle's air brakes.

2 Claims, 21 Drawing Sheets

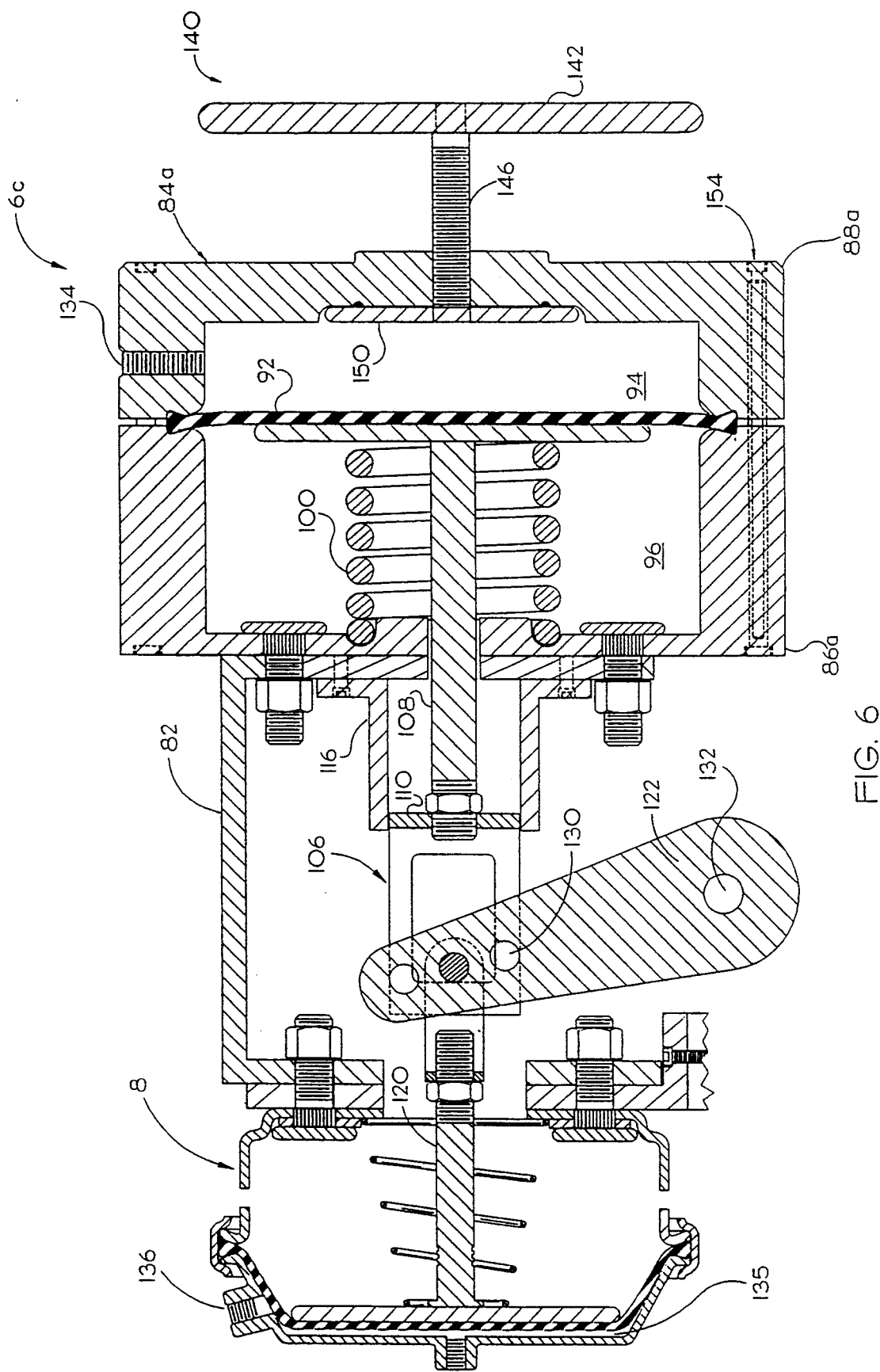

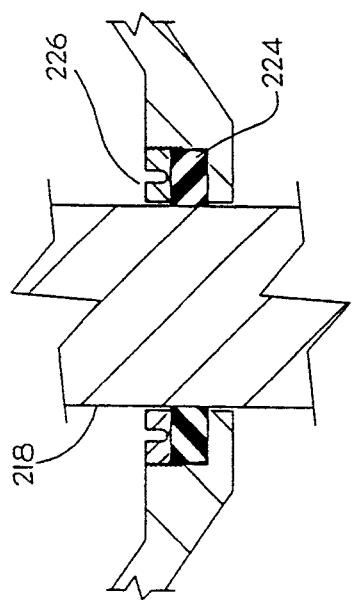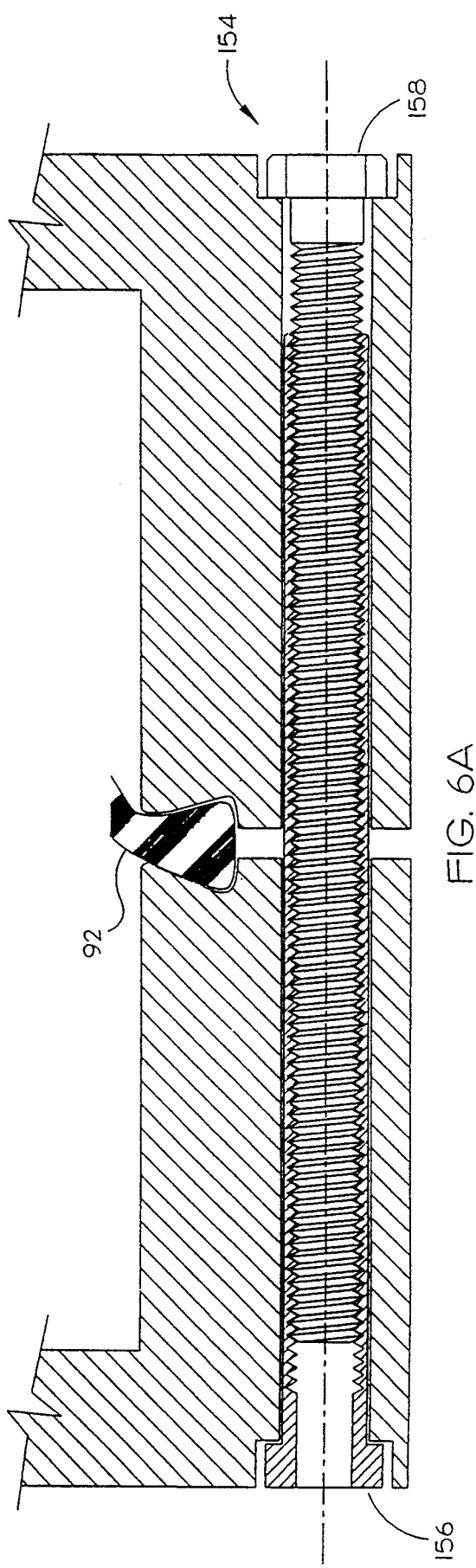

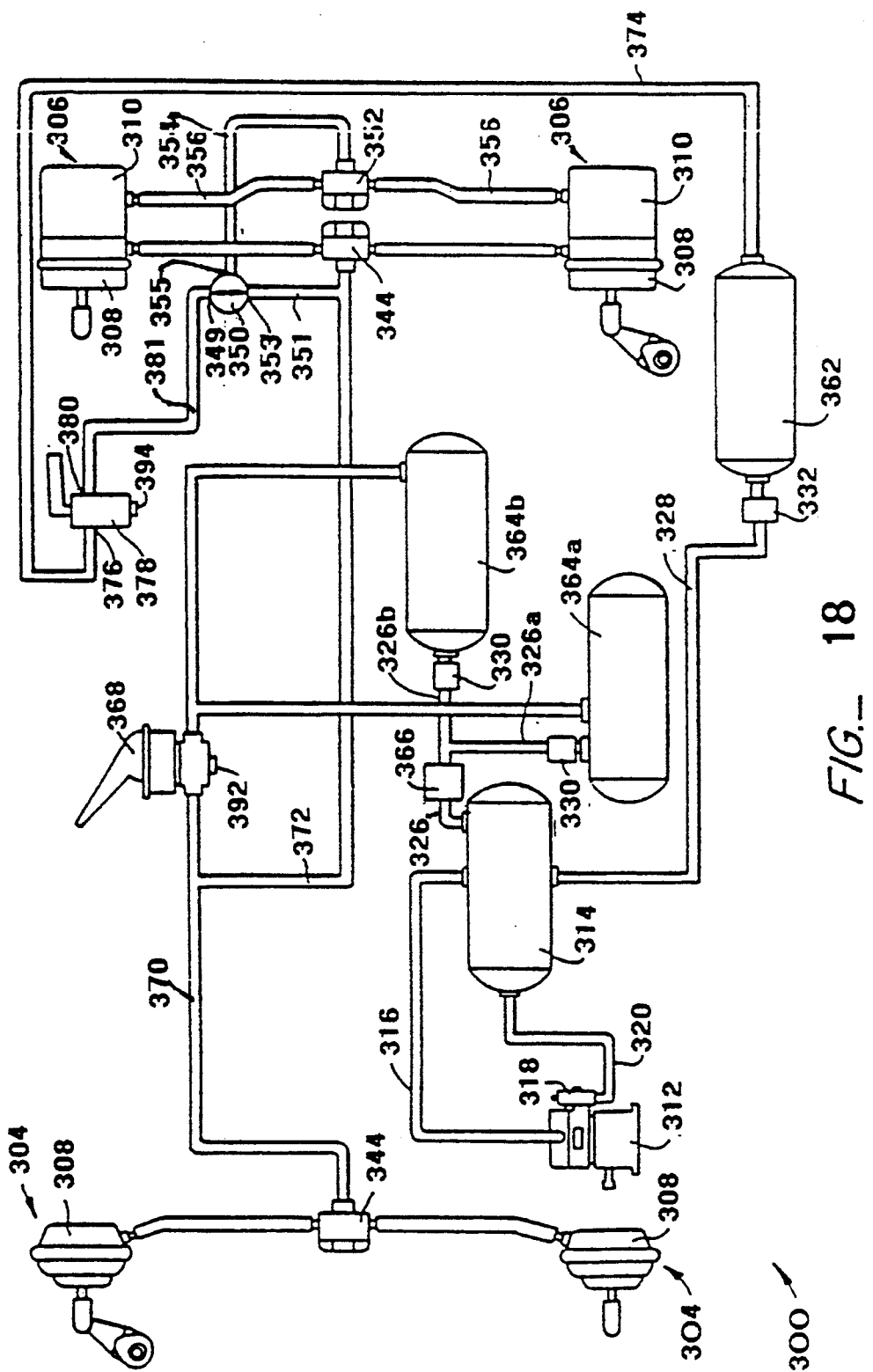
FIG._ 18

METHOD OF SUPPLYING A HIGHER PRESSURE RESERVE AIR SUPPLY FOR AIR BRAKE SYSTEM

This is a continuation of Rule 60 Divisional application Ser. No. 08/052,598, filed Apr. 22, 1993, now abandoned, which is a DIV of Ser. No. 07/916,652, filed Jul. 20, 1992, now U.S. Pat. No. 5,255,961, which is a CIP of Ser. No. 07/754,775, filed Sep. 04, 1991, now U.S. Pat. No. 5,154,491, which is a CIP of Ser. No. 07/606,386, filed Oct. 31, 1991, now abandoned, which is a CIP of Ser. No. 07/497,932, filed Mar. 22, 1990, now abandoned, which is a CIP of Ser. No. 07/430,755, filed Nov. 01, 1989, now U.S. Pat. No. 4,973,107.

BACKGROUND OF THE INVENTION

Many large vehicles use air brake systems. These brake systems include air actuated service brakes coupled to service brake actuators. Pressurized air, typically at 100 psi, is applied to the service brake chambers of the service brake actuators to apply the service brakes. To keep the brakes applied when parked, combination brake actuators are usually used. A combination brake actuator includes a spring brake portion and a service brake portion. The spring and service brake portions include respective spring and service brake chambers, each defined in part by a piston or, more commonly, by a diaphragm assembly, connected to a push rod assembly. The push rod assembly is connected to the brake, typically by a slack adjuster. The spring brake portion also includes a heavy actuator spring, coupled to the push rod assembly, which tends to push on the push rod to apply the brake. Supplying pressurized air to the service brake chamber applies the associated brake while supplying pressurized air to the spring brake chamber compresses the actuator spring to release the brake. Thus, when parked, air is exhausted from the spring brake chamber which allows the actuator spring to push on the push rod and apply the brake according to the force of the actuator spring.

One of the problems with conventional air brake systems is that the braking force generated by the spring brake portion of the combination brake actuator is only about 50% of the maximum braking force generated by an applied service brake. Therefore, with the spring brakes applied each axle with combination brake actuators has only about half the braking force which is available with the service brakes. One reason conventional combination brake actuators are so designed is to protect the brakes. That is, if the vehicle is parked and drum brakes are set while the drums are warm, upon cooling the drums have a tendency to contract which can, if the braking force is too high, result in damage to the brakes. In addition, conventional combination brake actuators have the service brake and spring brake chambers housed within a common housing; this limits the size of the actuator piston or diaphragm thus limiting the strength of the actuator spring. Also, not all of the axles have combination brake actuators; due to economy and space requirements, often no more than half the axles are so equipped. Although the resulting braking force is sufficient for parking purposes, in an emergency, such as when service brake air pressure is lost, the braking force available is woefully inadequate.

Smaller automotive vehicles typically use hydraulic brake systems. Parking brakes with conventional hydraulic brake systems rely on a manual parking brake which is actuated by stepping on a pedal or pulling on a handle. The pedal or handle is connected to a cable which in turn pulls on a pair of cables ultimately connected to the rear brakes. While manually applied parking brakes are generally adequate for most parking situations, they are quite limited in their ability to act as emergency brakes due to the low force exerted, the application of parking brakes to only the rear wheels and the lack of any sort of effective modulation of the braking force.

SUMMARY OF THE INVENTION

The invention is directed to a system which provides an emergency and parking (E&P) brake system in a manner which provides numerous advantages over existing systems.

The E&P brake system is used with a brake system of the type including a brake and a source of braking force, such as a compressed air tank, coupled to a brake actuator. The brake actuator includes a movable brake actuator element, typically called a slack adjustor, movable between brake released and brake applied positions. The E&P system includes an E&P actuator which is located a distance from the brake actuators, typically in the cab or at some other protected but relatively accessible position. The E&P actuator has a variable volume spring brake chamber which is defined in part by a spring brake chamber element, typically of a piston or diaphragm type, movable between first and second positions. The E&P actuator also includes a variable volume spring deflection compensation chamber defined in part by a movable compensation chamber element. A compression spring is positioned between the spring brake chamber element and the compensation chamber element.

The spring brake chamber element is connected to the brake actuator element, typically by a flexible cable. Thus, moving the spring brake chamber element from the first position to the second position applies a braking force to the brake actuator element. The spring brake chamber element is normally maintained in its first position by pressurizing the spring brake chamber. However, by depressurizing the spring brake chamber, such as during parking, the spring brake chamber element moves from the first position to the second position so to apply a parking brake force.

If one depressurizes the spring brake chamber while pressurizing the compensation chamber, the compensation chamber element moves against the spring thus recompressing the spring. This causes an increased emergency braking force to be applied to the brake actuator element by the spring over what would otherwise have been applied by the spring.

The E&P brake system uses an E&P actuator located physically separate from the one or more brake actuators it services. This permits the E&P actuator to be positioned in an area of the vehicle which is easier to get at for adjustment and maintenance than if the an E&P actuator were mounted directly to the service brake actuator. Many of the problems associated with repair and removal of spring brake actuators are avoided with the E&P brake system. The E&P actuator can be designed to be located on the vehicle at a position which is protected from the elements, such as water, snow and road salt. This accessibility allows the user to manually release the parking brakes in a convenient manner, as opposed to having to crawl under the vehicle, often under cold and wet conditions, to release conventional spring brakes. The system eliminates the need for the much heavier and expensive dual chamber brake actuators. The use of service brake actuators, in addition to freeing up space for the vehicle designer, also lessens the amount of support which is needed to support the brake actuator.

The invention is especially suited for retrofit applications. Since a single E&P actuator can be used with more than one brake actuator, weight and costs can reduced when compared with conventional dual chamber brake actuators. More wheels can be provided with emergency and parking braking capability than are now so provided because of the efficiencies of the E&P brake system.

Conventional spring brakes can be taken apart and repaired only with special care; many accidents have been caused when special safety procedures have not been closely followed. The E&P actuator is preferably designed to be worked on safely. The user can manually release the brakes using the brake release wheel, uncouple the cables from the E&P actuator and then disassemble the E&P actuator. Preferably, the E&P actuator does not become fully disassembled until the spring is fully expanded so parts do not fly apart during disassembly.

Although parking brake force need not be modulated, emergency braking force is preferably modulated to be most effective. This can be accomplished with the E&P brake system.

Since the force exerted by the E&P actuator is completely independent of the force exerted by the service brake actuator, the force exerted by the E&P brake system can be much greater than that which could be exerted if one were limited according to the size of the service brake chamber. The E&P brake force need not be proportional to the service brake force because it is independent of it.

Other features and advantages will appear from the following description in which the preferred embodiment has been set forth in detail in conjunction with the accompanying drawings.

BRIEF DESCRIPTION OF THE DRAWINGS

FIG. 4A shows an alternative embodiment of the actuator of FIG. 4 which ensures the brake application spring is fully extended before the housing parts are released by the clamp ring during assembly or disassembly of the spring brake actuator;

FIG. 6 shows an alternative embodiment of the actuator of FIG. 2 in which the first and second housing parts of the spring brake actuator are secured together using a special nut and bolt assembly which ensures that the brake application spring will be fully extended before the housing parts are released from one another when disassembling the spring brake actuator;

FIG. 6A is an enlarged side view of the nut and bolt assembly shown in dashed lines in FIG. 6;

FIG. 8A is an enlarged view showing one of the seals of FIG. 8;

FIG. 18 shows an air brake system including air tanks at two pressure levels.

DESCRIPTION OF THE PREFERRED EMBODIMENT

Figure 1:
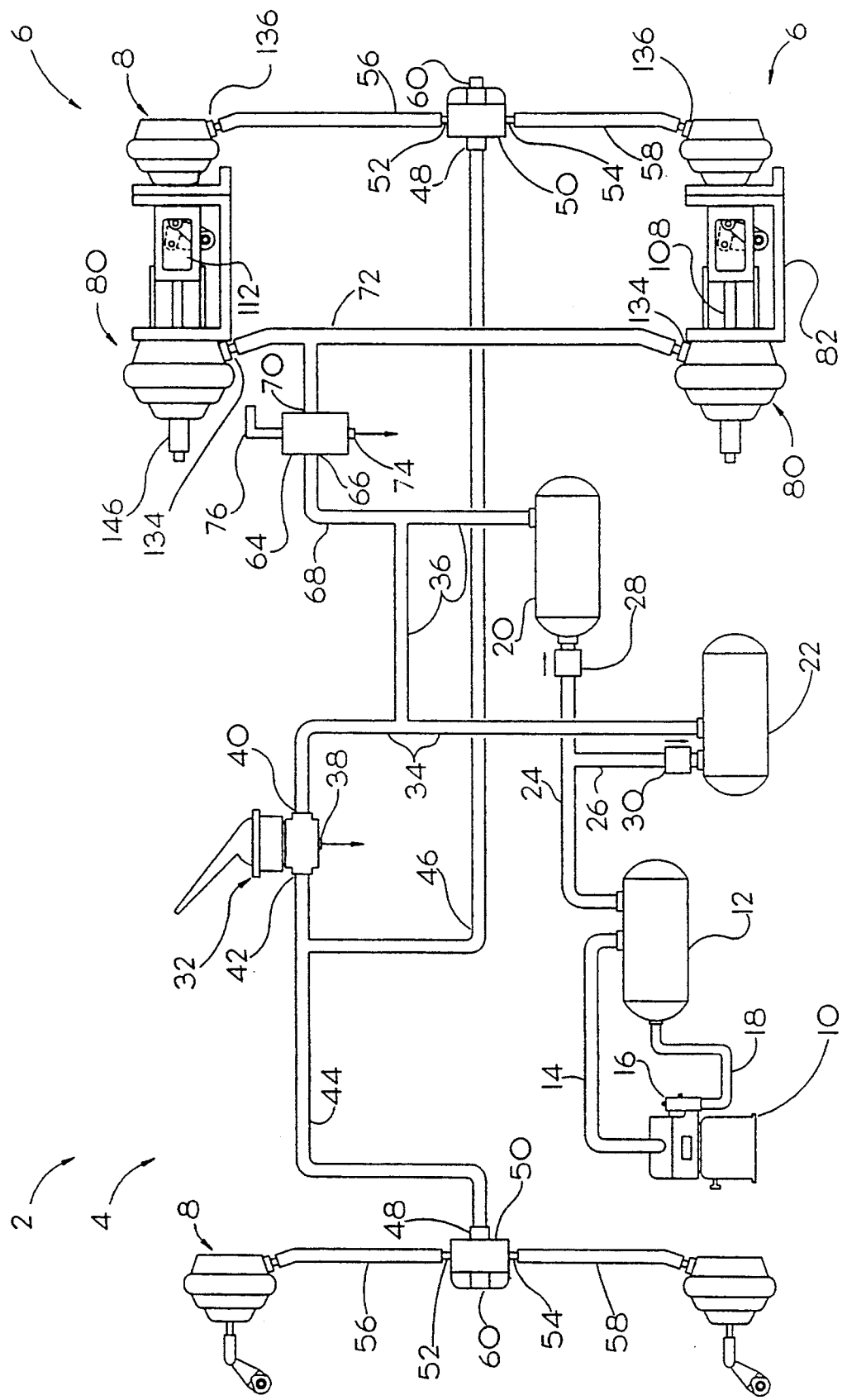
FIG. 1 is a simplified schematic view of an improved brake system made according to the invention.

FIG. 1 shows an improved brake system 2 of the type including an air brake system 4 with which a pair of multi-chamber brake actuators 6 are used. Air brake system 4 includes four service brake actuators 8, two each at the front and rear axles. The two service brake actuators 8 at the rear axle are incorporated into multi-chamber brake actuators 6. Compressed air is supplied by a compressor 10 which feeds a supply or wet tank 12 with pressurized air along a line 14. Pressure within tank 12 is regulated by a governor 16 coupled to tank 12 through a line 18. Governor 16 maintains the pressure within wet tank 12 at about 100 psi.

Wet tank 12 supplies pressurized air to a pair of supply tanks 20, 22 through lines 24, 26 and check valves 28, 30. Pressurized air within supply tanks 20, 22 is directed to a service brake application valve (pedal valve) 32 through lines 34, 36. Valve 32 has an exhaust port 38, an inlet port 40 and an outlet port 42. Normally, that is with pedal valve 32 not depressed, outlet port 42 is coupled to exhaust port 38 so that lines 44, 46 are at atmosphere. Lines 44, 46 are coupled to the inlets 48 of quick release valves 50 at each axle. Quick release valves 50 each have outlet ports 52, 54 which are coupled to service brakes actuators 8 through lines 56, 58. Thus, when pedal valve 32 is activated or depressed, ports 40 and 42 are coupled to supply pressurized air to service brake actuators 8 through lines 44, 46, 56, 58. See FIG. 3. Deactuating pedal valve 32 couples ports 42 and 38, thus dropping the pressure at inlet 48 of each quick release valve 50 to atmosphere. This permits air within lines 56, 58 to exhaust through exhaust port 60 of each quick release valve 50, thus dropping the pressure within service brake actuator 8.

The above-described structure is generally conventional. System 4 includes a modulated-type E&P brake control valve 64 having an inlet 66 coupled to line 36 by a line 68 and an outlet port 70 coupled to a line 72. Valve 64 also includes an exhaust port 74. Normally, valve 64 couples ports 70, 74 so that line 72 is exhausted to atmosphere. However, by manipulation of handle 76, valve 64 couples ports 66, 70 to permit line 72 to be pressurized. Valve 64 is preferably of a modulated type, as opposed to an on/off type, and is in common use in vehicle air brake systems in Europe.

Figure 2:
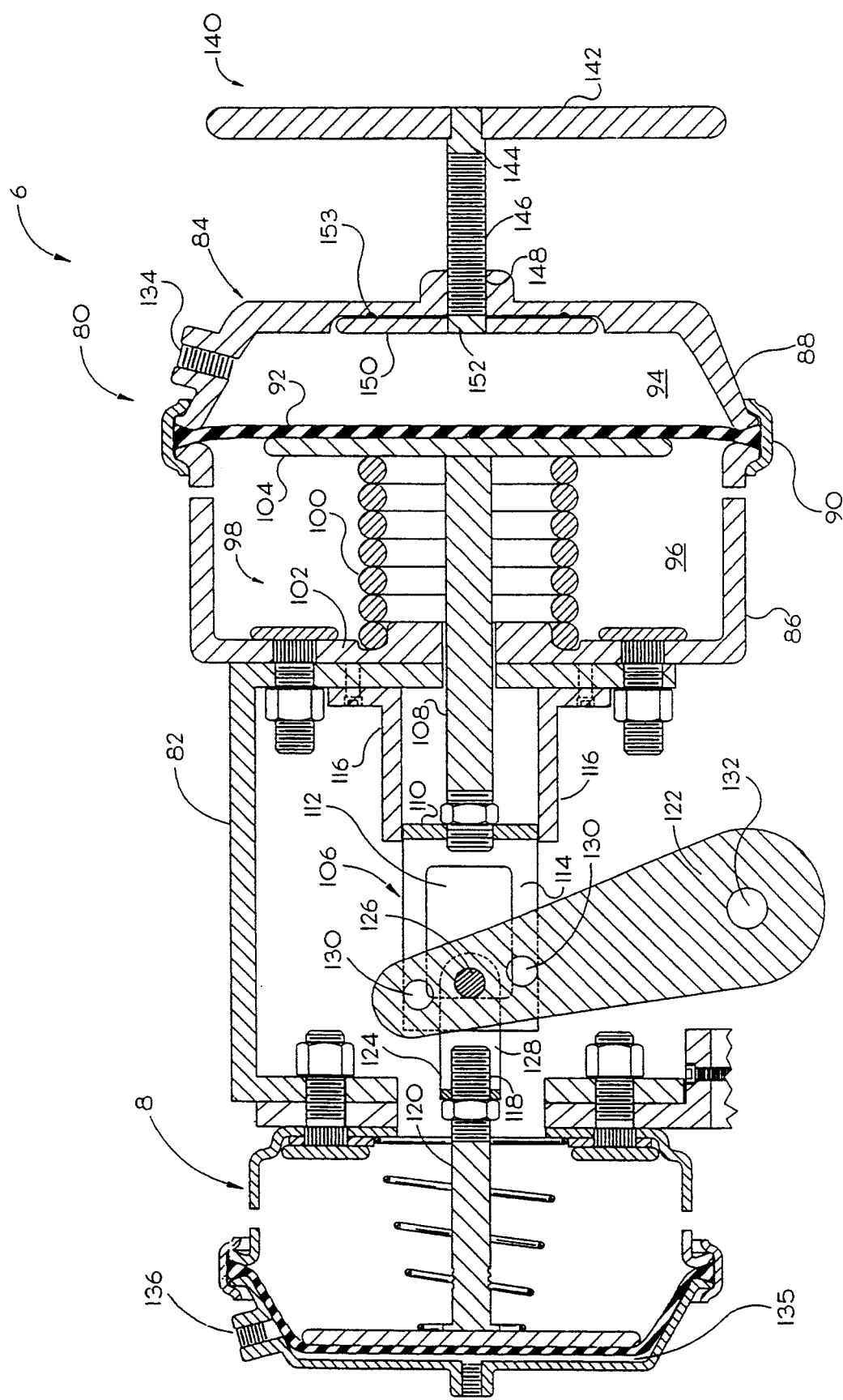
FIG. 2 is a side cross-sectional view of the multi-chamber brake actuator of FIG. 1 with the service brake actuator in the brakes off position and the spring brake actuator in the brakes free position.
Figure 2A:
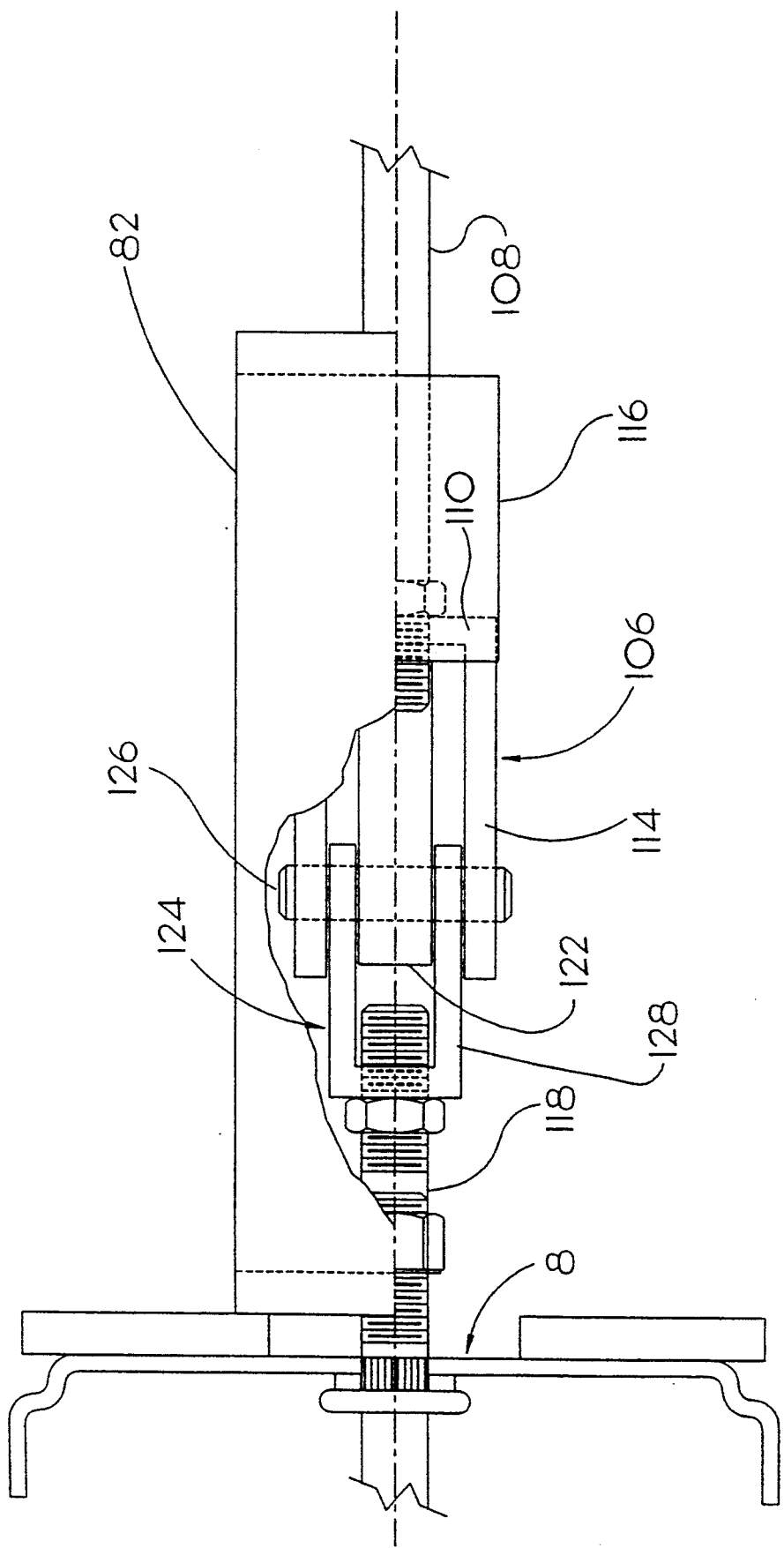
FIG. 2A is a top plan view of a portion of the brake application assembly of FIG. 2.

FIG. 2 illustrates multi-chamber brake actuator 6 in more detail. Actuator 6 includes a spring brake actuator 80 mounted directly to service brake actuator 8 by a U-shaped bracket 82. Spring brake actuator 80 includes a two-part housing 84 including a first part 86 and a second part 88 coupled to one another by a conventional clamp ring 90. Parts 86, 88 capture a diaphragm 92 which separates the interior of housing 84 into a spring brake chamber 94 and a vented region 96. Dual chamber brake actuator also includes a brake actuation assembly 98 including a brake actuation spring 100 of the coil compression spring type housed within region 96 and captured between the base 102 of first part 86 and a movable pressure plate 104 which lies against diaphragm 92. Pressure plate 104 is connected to a yoke 106 by a shaft 108. Shaft 108 is threaded to an end plate 110 of yoke 106. As shown in FIG. 2A, yoke 106 is generally U-shaped and has a central opening 112 formed in the legs 114 of the yoke. The movement of yoke 106 is guided by a pair of L brackets 116 which are mounted to bracket 82 opposite base 102. The outer end 118 of a push rod 120 is connected to a slack adjuster 122 through the use of a threaded clevis 124 and a pin 126 which passes through the arms 128 of clevis 124.

Legs 114 of yoke 106 are spaced far enough apart so that clevis 124, with slack adjuster 122 positioned between arms 128 of the clevis, can fit between legs 114. As is conventional, slack adjuster 122 has a number of holes 130 through which pin 126 can pass. These various holes are used to allow the user to adjust the amount of slack provided the brake, to which slack adjuster 122 is connected through its pivot 132, as is conventional.

During normal brakes-off operation, spring brake actuator 80 is in the brakes free position with chamber 94 pressurized through the connection of a spring brake port 134 to line 68 through line 72 and valve 64; also, service brake chamber 135 is in the brakes-off position of FIG. 2 by exhausting air through port 136. Air is exhausted through port 136 of pedal valve 32 by connecting line 46 to exhaust port 38 which causes quick release valve 50 to connect line 56 to exhaust port 60.

Figure 3:
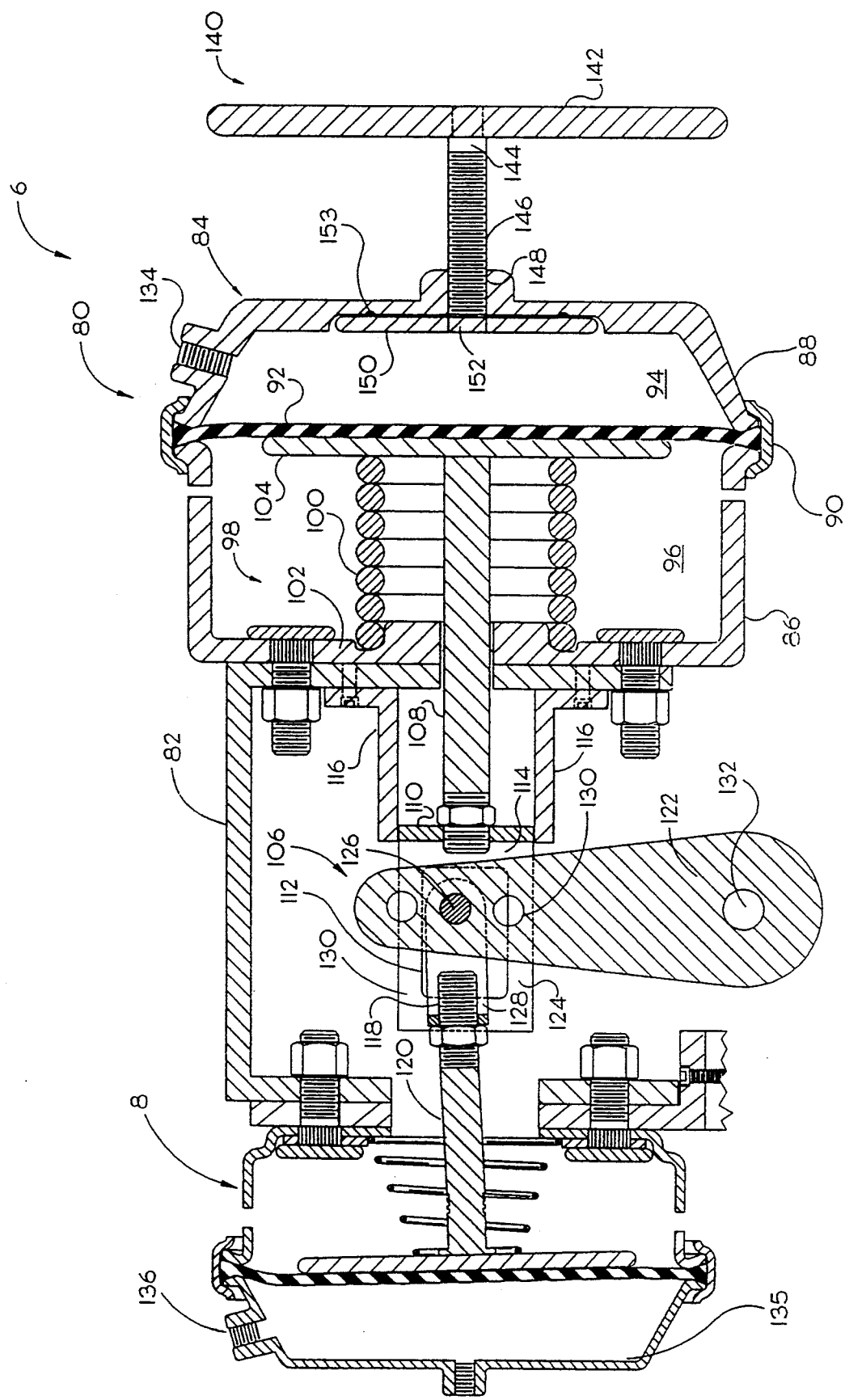
FIG. 3 shows the actuator of FIG. 2 with the service brake actuator in the brakes on position and the spring brake actuator in the brakes free position.

Pressing on pedal valve 32 pressurizes line 46, line 56 and thus service brake chamber 136 to cause push rod 120 to move from the brakes off position of FIG. 2 to the brakes on position of FIG. 3. It can be seen that this movement is not substantially hindered by brake application assembly 98 since pin 126 simply passes within opening 112 substantially unrestricted. Thus, with spring brake chamber 94 pressurized as in FIGS. 2 and 3, spring brake actuator is in the brakes free position since the brakes are free to be applied or not applied according to the pressurization of spring brake chamber 94.

Figure 4:
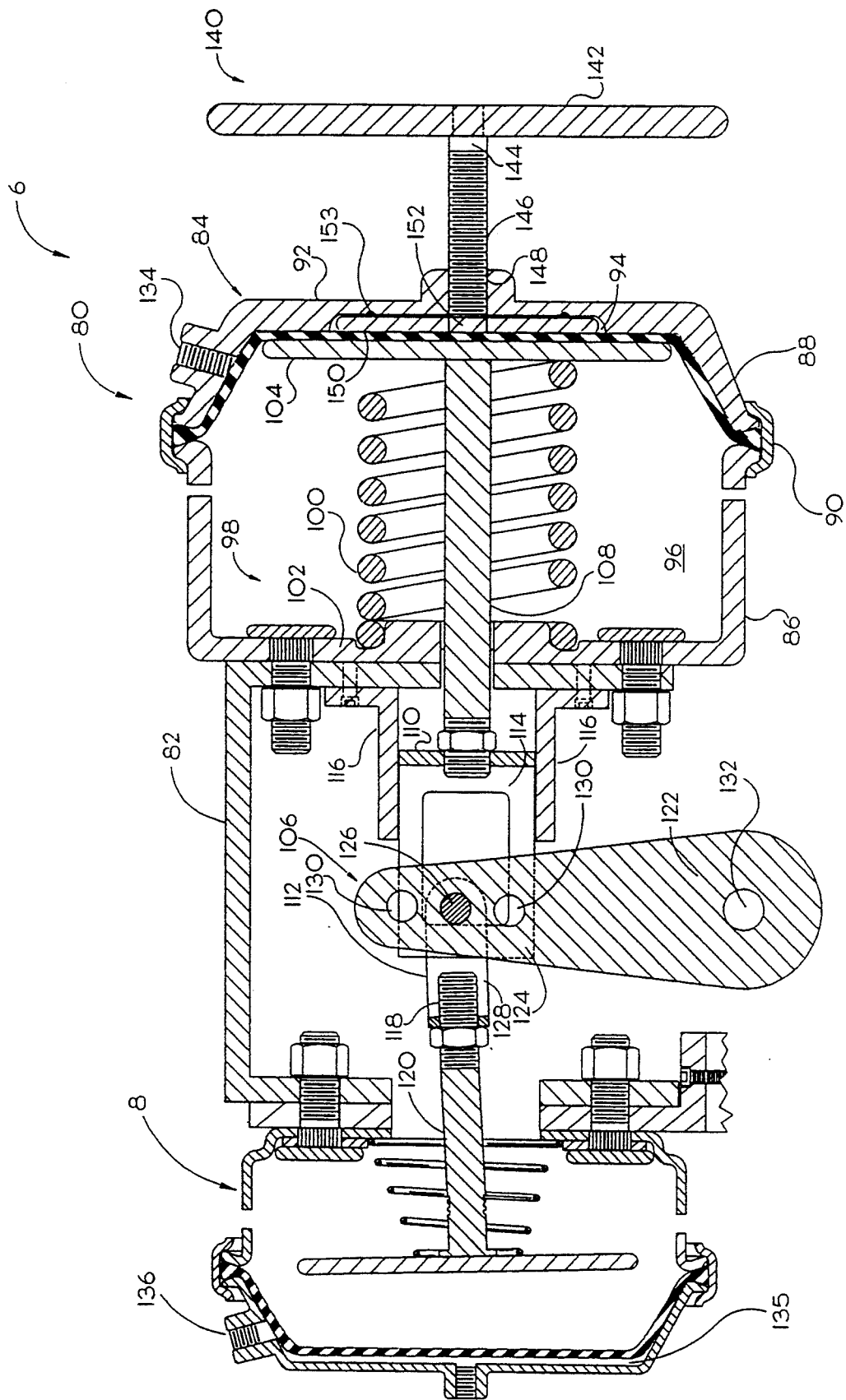
FIG. 4 shows the actuator of FIG. 2 with the service brake actuator in the brakes off position and the spring brake actuator in the brakes applied position.

FIG. 4 illustrates multi-chamber brake actuator 6 with service brake chamber 135 vented to atmosphere, so that service brake actuator 8 is in the brakes off position, and with spring brake chamber 94 also vented to atmosphere, so that spring brake actuator 80 is in the brakes applied position. Spring brake chamber 94 is vented by actuation of handle 76 which coupled ports 70, 74 and thus vents line 72. Venting chamber 94 allows spring 100 to expand to the position of FIG. 4, thus causing brake actuation assembly 98 to pull on push rod 120 and rotate slack adjustor 122 from the position of FIG. 2 to the position of FIG. 4, thus applying the brakes. Note that the brakes are applied according solely to the force of brake application spring 100 against movable pressure plate 104. Thus, FIG. 4 illustrates the normal emergency and parking brake situation with both chambers 94, 135 vented to atmosphere.

As can be seen by reviewing FIG. 4, the size of housing 84 is not controlled by the size of service brake actuator 8. Therefore, by providing a larger diameter diaphragm 92 than would be possible with a housing the same size as the housing used for service brake actuator 8, spring 100 can be stronger than would otherwise be permissible, thus increasing the force of the emergency and parking brake. This permits the brake force supplied by spring brake actuator 80 to be tailored to what is needed, not what might be available by virtue of the size of service brake actuator 8.

Figure 5:
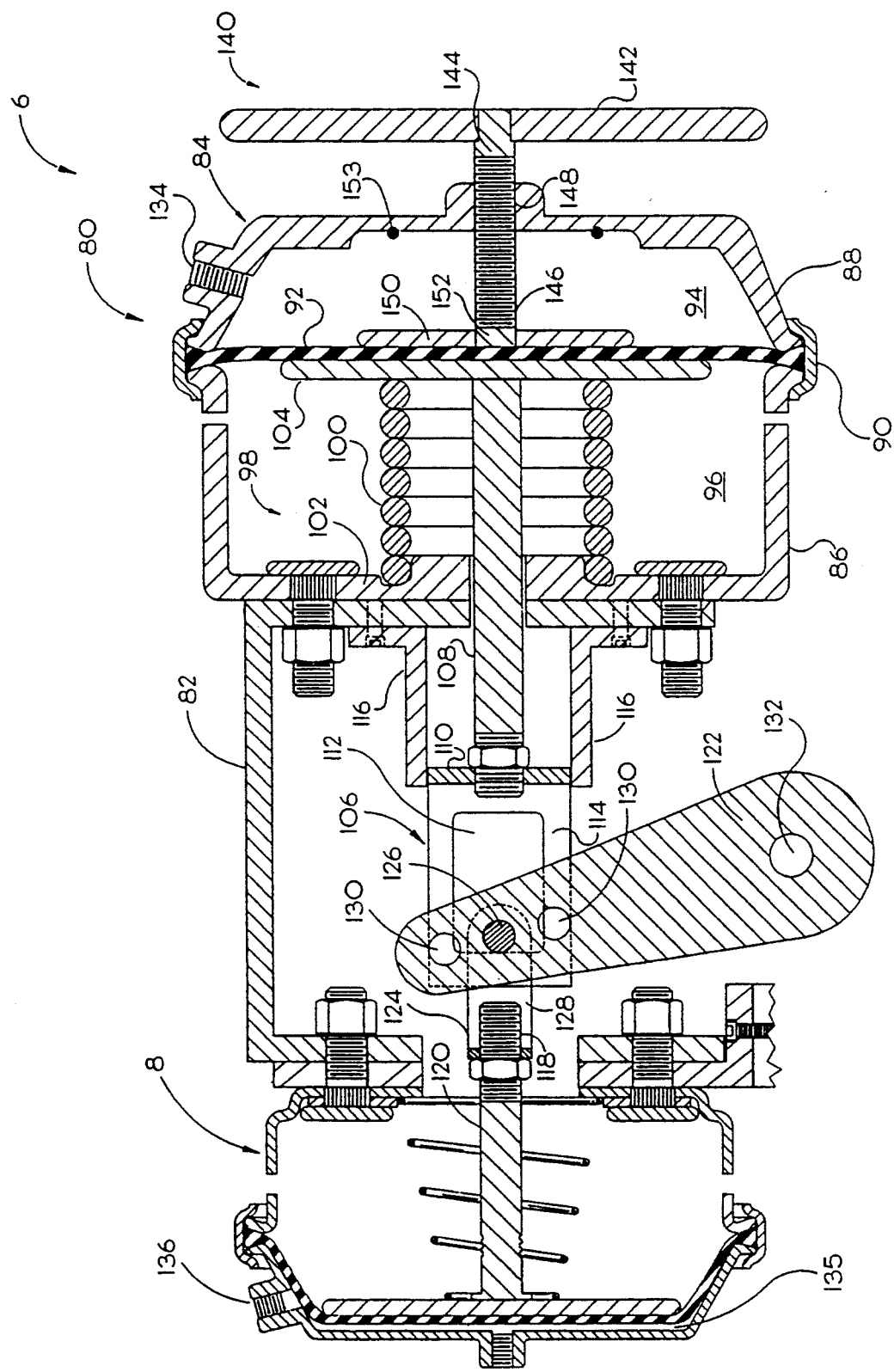
FIG. 5 shows the actuator of FIG. 2 with the service brake actuator in the brakes off position and the application spring compressing assembly compressing the application spring thus forcing the spring brake actuator into the brakes free position regardless of the pressurization of a spring brake chamber.

At times it may be wished to manually release the brakes when the vehicle is parked. This can be done using an application spring compressing assembly 140 as shown in FIGS. 4 and 5. Assembly 140 includes a handle 142 removably mounted to the keyed outer end 144 of a threaded shaft 146. Threaded shaft 146 passes through a threaded hole 148 formed in second part 88 of housing 84. Threaded shaft 146 has a biasing plate 150 at its inner end 152. Normally, plate 150 is kept pressed against second part 88 of housing 84 to compress an O-ring 153 to seal threaded hole 148. To recompress spring 100, handle 142 is rotated, thus driving plate 150 to the left in FIG. 5 until spring 100 is compressed sufficiently so as to release the brakes. Doing so also effectively keeps spring brake actuator 80 in the brakes free position since spring 100 will stay compressed regardless of the pressurization of chamber 94. Handle 142 is typically removed and placed in the cab or toolbox and retrieved when needed.

FIG. 6 shows an alternative embodiment of the multi-chamber brake actuator 6 of FIG. 2. Actuator 6c is similar to actuator 6 with the exception of housing 84a. Housing parts 86a, 88a are secured together using three or more nut and bolt assemblies 154, shown in more detail in FIG. 6A. Nut and bolt assemblies 154 include tubular nuts 156 and a mating bolt 158. Both are extra long to permit the safe disassembly of housing 84a. That is, unscrewing nut and bolt assemblies 154 permits first and second parts 86a, 88a to separate slowly, thus allowing spring 100 to separate slowly until no compression exists. Nut and bolt assembly 154 is sized so that spring 100 is completely extended before nuts 156 and bolts 158 are completely disengaged from one another. This substantially eliminates the danger which also always exists if one attempts to disassemble a spring brake actuator, especially in the field. This is especially important because the force of spring 100 is sufficient to cause serious injury or death if housing 84a is disassembled improperly.

Figure 4A:
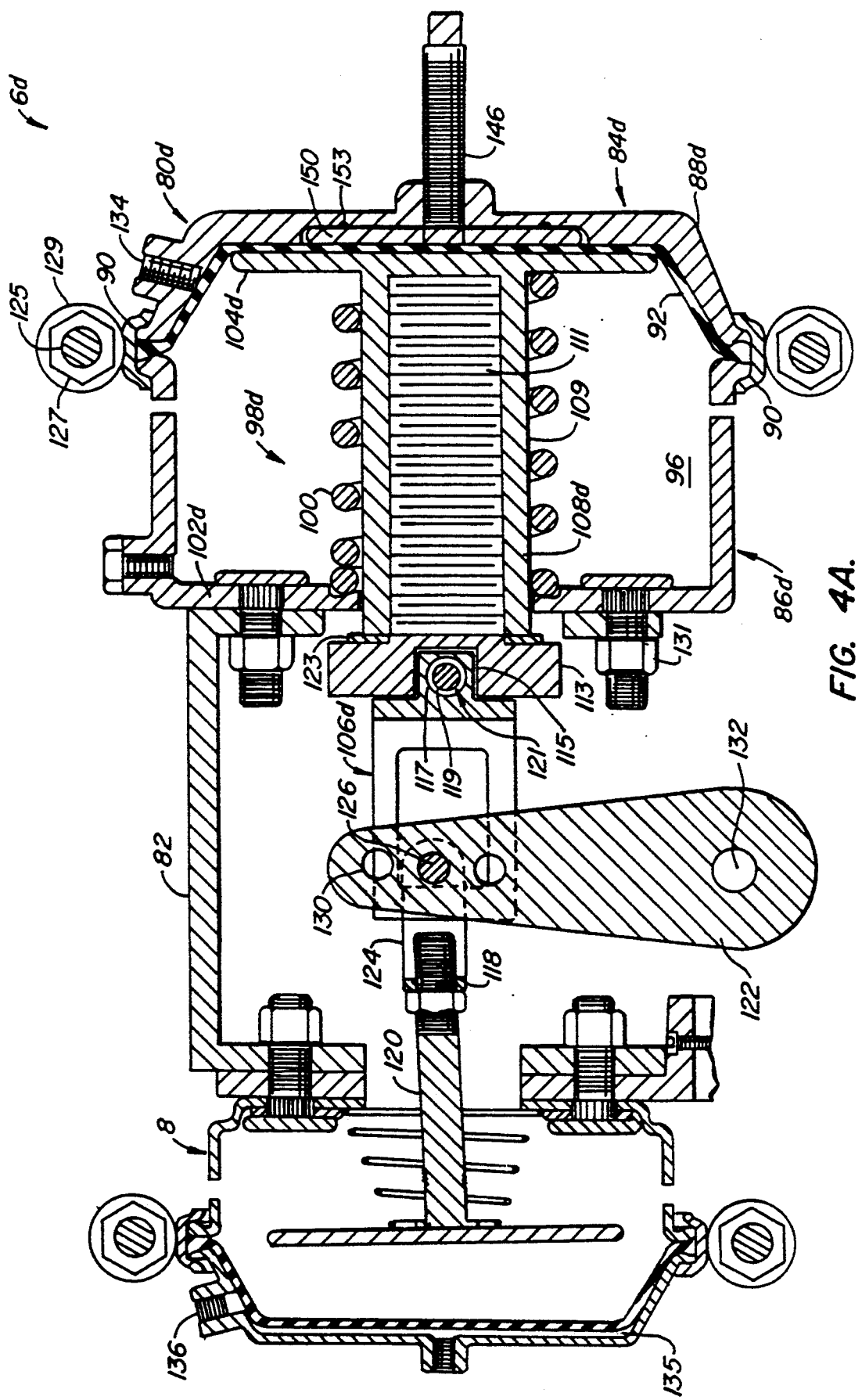
FIGS. 4A shows an alternative embodiment of the actuator of FIG. 4 which ensures the brake application spring is fully extended before the housing parts are released by the clamp ring during disassembly of the spring brake actuator.

FIG. 4A illustrates a different method which allows spring 100 to separate slowly until no compressive forces exist for safe assembly and disassembly. Actuator 6d is similar to actuator 6 with the following exceptions. Shaft 108 is replaced by a larger diameter shaft assembly 108d, which includes an internally threaded tubular element 109 and an externally threaded shaft element 111 threadably engaged within tubular element 109. Shaft element 111 has an enlarged head 113 having a central opening 115 formed therein. Yoke 106d has a tip 117 sized to fit within opening 115 and has a lateral bore 119 formed therethrough. Head 113 also has a similarly sized and positioned bore which aligns with bore 119 to allow a tapered pin 121 to be driven into the two bores so to secure yoke 106d to head 113.

Brake actuator 6d also includes a washer 123 positioned between base 102d and head 113. The embodiment of FIG. 4A also looks different from that of FIG. 2 with regard to clamp ring 90. However, clamp ring 90 of FIG. 4A is the same type of conventional clamp as in FIG. 2. However, in the embodiment of FIG. 4A, bolt 125, nut 127 and clamp ring 129, all conventional, are illustrated in FIG. 4A.

To release spring brake actuator 80d from service brake actuator 8, the user knocks out pin 121 and removes nuts 131. Actuator 80d is free without disturbing any service brake functions of service brakeactuator 8. Spring brake actuator 80d is then separated from bracket 82. Removing pin 121 thus allows the brakes to be released even when no air pressure exists in the system, which sometimes must be done, for example, to move a disabled vehicle to a shop for repair.

In the embodiment of FIG. 4A, slack adjuster 122 is shown adjusted so that when the brakes are applied by spring 100 forcing pressure plate 104d to the right, brake actuation assembly 98d is fully to the right. In practice, there will be a space between diaphragm 92 and second part 88d of housing 84d and between washer 123 and bracket 82 when the brakes are applied. Assuming such a space exists and assembly chamber 94 is not pressurized, removing pin 121 allows pressure plate 104d to move quickly against second part 88d of housing 84d. To prevent this from occurring, plate 150 can be driven against diaphragm 92 prior to removing pin 121. However, the use of application spring compression assembly 140 is optional with actuator 6d.

To disassemble spring brake actuator 80d, that is allowing parts 86d, 88d to separate from one another, clamp ring 90 is removed from parts 86d, 88d by loosening bolts and nuts 125, 127. This allows second part 88d of housing 84d to be removed from first part 86d so that, for example, diaphragm 92 can be removed and replaced as needed. Spring 100 is held in place by plate 104d through the engagement of head 113 with washer 123 against base 102d. To remove spring 100, head 113 is rotated counterclockwise which causes tubular element 109 to slowly disengage from shaft element 111, thus slowly and controllably permitting spring 100 to expand. Tubular element 109 and shaft element 111 do not completely disengage until after spring 100 has become completely expanded so to prevent injury to the user.

Figure 7:
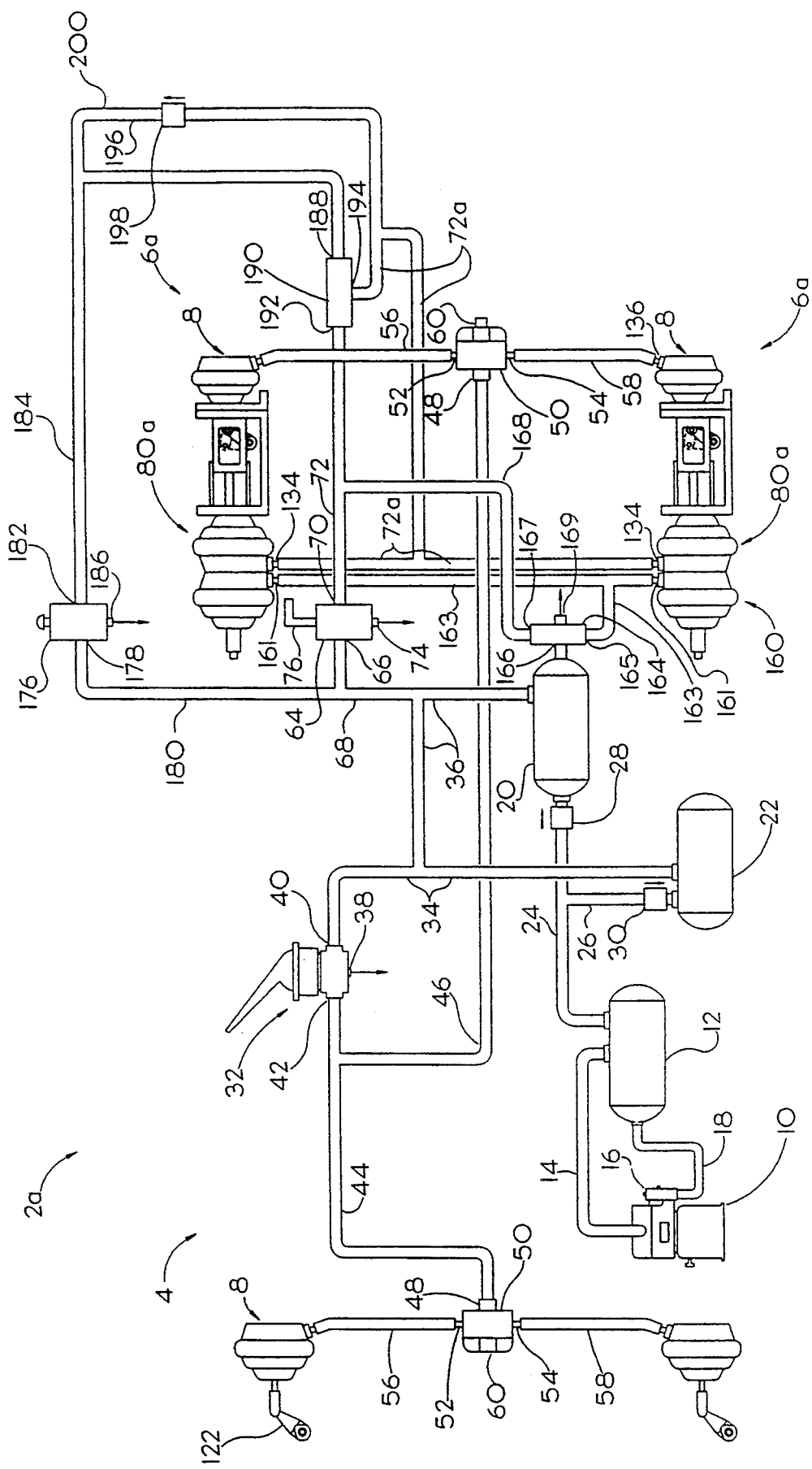
FIG. 7 is a simplified schematic view of an alternative embodiment of the system of FIG. 1 using a dual force level spring brake actuator constructed to exert two levels of force to accommodate emergency and parking situations.

FIG. 7 illustrates an improved braking system 2a which uses a modified multi-chamber brake actuator 6a including a dual force level spring brake actuator 80a constructed to exert two levels of force to accommodate the higher force needed during emergency situations and the lower force needed during parking. System 2a is very similar to system 2 with like reference numerals referring to like components. System 2a includes a parking brake control valve 176 having an inlet 178 connected to line 68 by a line 180, an outlet 182 connected to a line 184, and an exhaust 186 opening into atmosphere. As with conventional parking brake control valves, actuating valve 176 couples outlet 182 with exhaust 186 thus dumping any high pressure air in line 184 to atmosphere. Deactivating valve 176 couples inlet 178 and outlet 182 thus pressurizing line 184. Line 184 connects to the control port 188 of a pilot control valve 190. Pilot control valve 190 has an inlet 192 and an outlet 194 positioned along line 72. Inlet 192 is connected to outlet 194 only when a pressure, typically above about 50 psi, is applied to control port 188; otherwise flow from inlet 192 to outlet 194 is prevented.

A bypass line 196 having a check valve 198 is connected to lines 184, 72a. Check valve 198 permits fluid flow along 196 from line 72a to line 184 but not the reverse. Line 72a provides pressurized air to ports 134.

Figure 8:
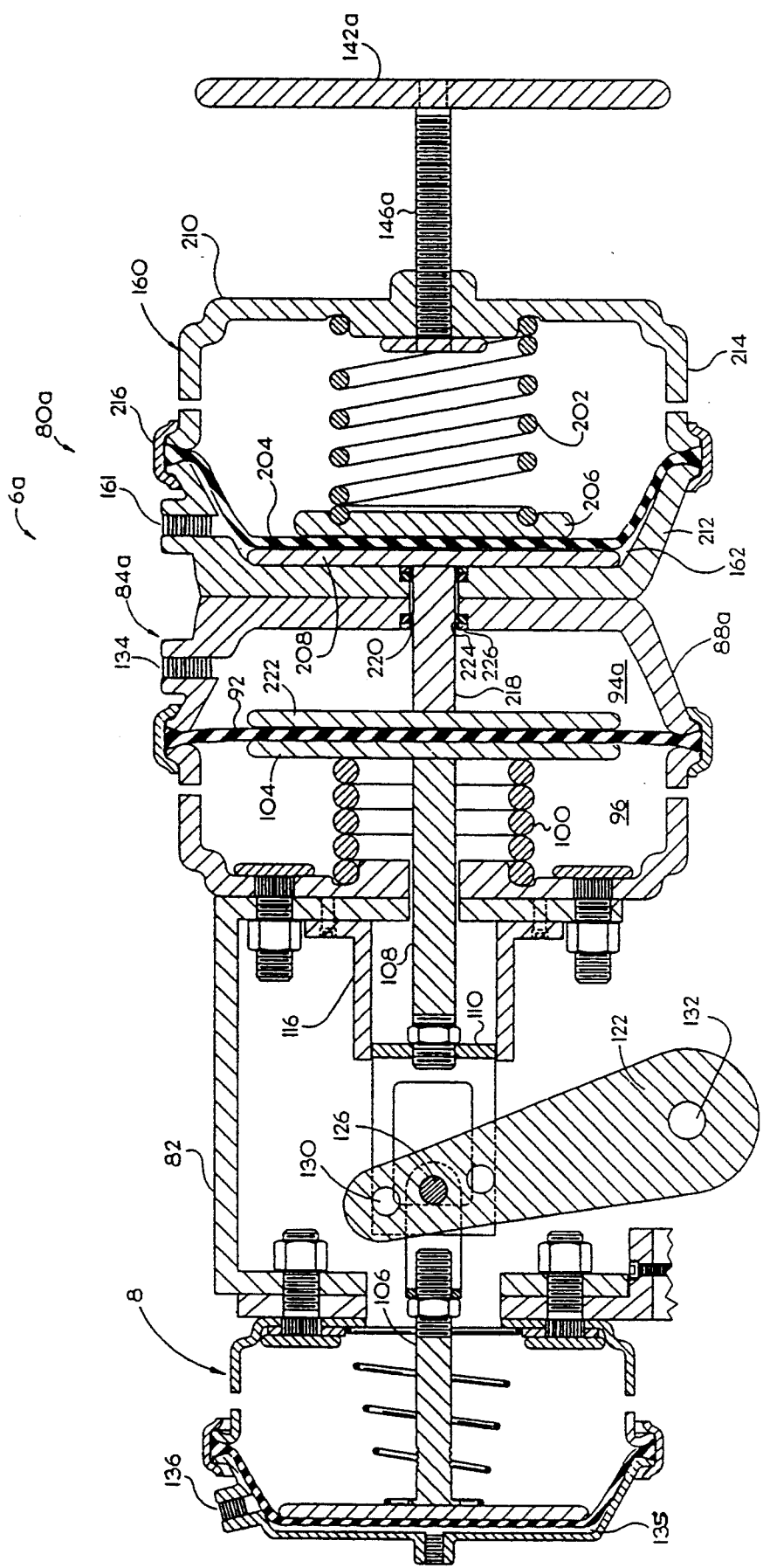
FIG. 8 is a cross-sectional view of the modified dual chamber brake actuator of FIG. 7 with the service brake actuator in the brakes off position and the dual force level actuator in the brakes free position.

Actuator 80a also includes a supplemental spring brake actuator 160 mounted to second part 88a of housing 84a. See FIG. 8. Actuator 160 has a port 161 which supplies a supplemental spring brake cheer 162 with pressurized air from tank 20 through a line 163 and a release exhaust valve 164. Release exhaust valve 164 has an outlet 165 connected to line 163, an inlet 166 connected to supply tank 20, a control port 167 connected to line 72 by a connecting line 168, and an exhaust port 169 coupled to the ambient environment. Release exhaust valve 164 is a conventional valve which fluidly couples inlet 166 and outlet 165 when the pressure at control port 167 is low. Release exhaust valve 164 fluidly couples outlet 165 to exhaust port 169, thus exhausting line 163 and supplemental spring brake chamber 162 to atmosphere through exhaust port 169, when the pressure at control port 167 is high.

Supplemental spring brake actuator 160 is used to reduce the maximum amount of force applied to slack adjustor 122. Thus, multi-chamber brake actuator 6a is capable of applying a first level force during normal braking, a second level of force during emergency situations, and a third level of force during parking. The third, parking level of force is lower than the second, emergency level of force. To do so, supplemental spring brake actuator 160 includes a supplemental spring 202, spring 202 being a lighter spring than spring 100. Spring 202 presses against a diaphragm 204 which is captured between a spring plate 206 and a support plate 208. Actuator 160 includes a housing 210 having first and second housing parts 212, 214 secured together by a band 216. Housing parts 214, 212 also secure diaphragm 204 within housing 210 so that diaphragm 204 and first housing part 212 define supplemental spring brake chamber 162 therebetween. Support plate 208 is connected to a connecting shaft 218 which extends through a coaxial opening 220 formed in parts 88a, 212. A second support plate 222 is mounted to the other end of shaft 218 and presses against diaphragm 92 opposite pressure plate 104.

Shaft 218 is sealed within opening 220 by a pair of annular seals 224. Seals 224, shown best in FIG. 8A, are resilient elastomeric seals capable of being deformed to press against shaft 218 by the engagement of a threaded nut 226. Threaded nut 226 is useful to adjust the amount of axial force on annular seal 224 so that if annular seal 224 begins to lose its sealing effectiveness, further tightening of threaded nut 226 can help to improve the seal. Instead of a resilient elastomeric material, seal 224 could be a generally nonresilient packing material.

During operation of system 2a, tanks 12, 20 and 22 and lines 14, 18, 24, 26, 34, 36 and 68 are pressurized under all circumstances. When driving without any brakes, see FIG. 8, lines 44, 46, 56, 58 and 163 are at atmospheric pressure while the remaining lines are pressurized. This causes spring brake chamber 94a to be pressurized; this also causes service brake chamber 135 and supplemental spring brake chamber 162 to be vented to atmosphere.

Figure 9:
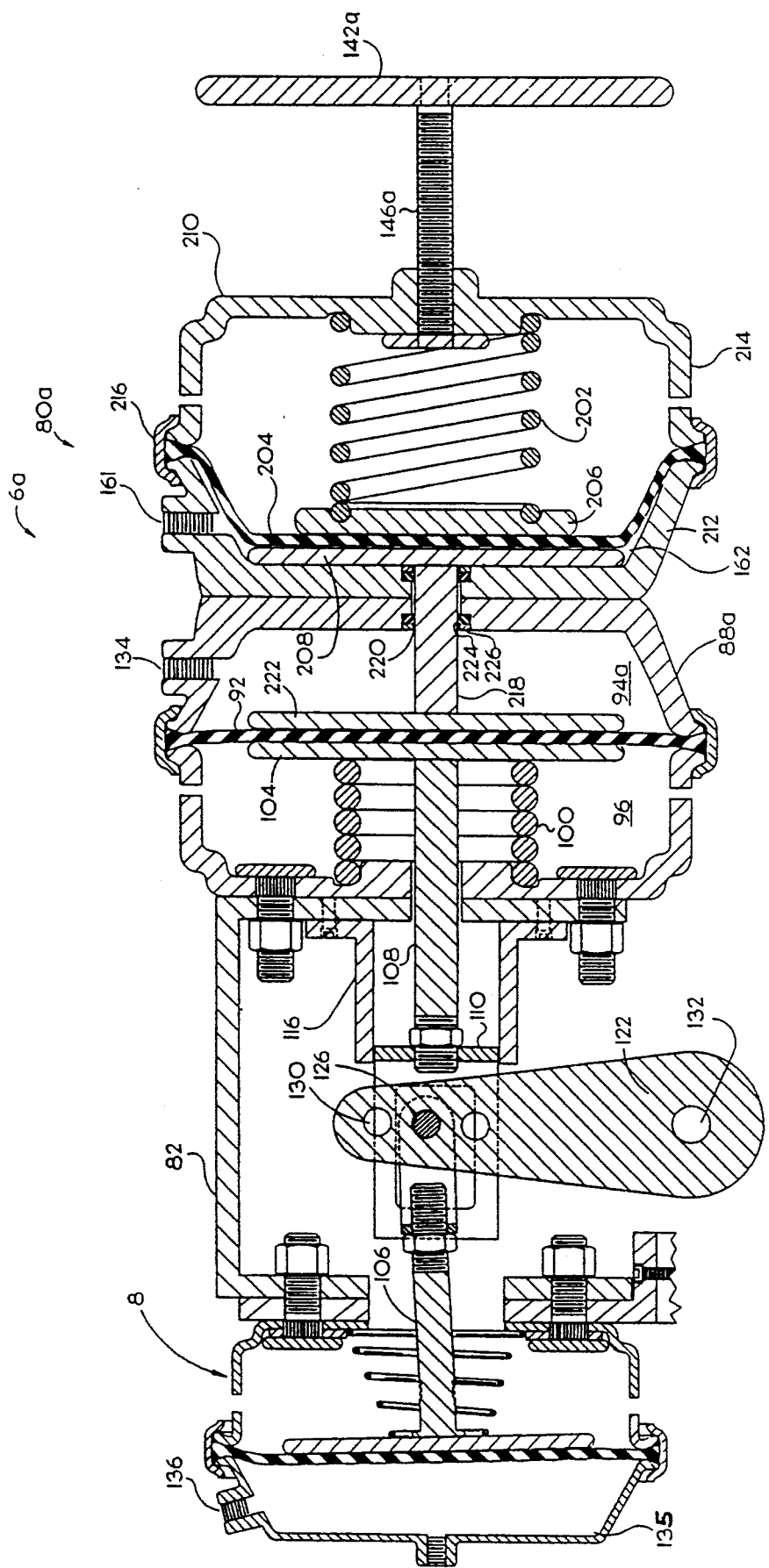
FIG. 9 shows the actuator of FIG. 7 with the service brake actuator in the brakes on position and the spring brake actuator in the brakes free position.

Applying service brakes by activating pedal valve 32, see FIG. 9, causes all lines except for line 163, connected to chamber 162, to be pressurized and thus moves slack adjusters 122 from the solid line position of FIG. 7 to the dotted line position of FIG. 7.

Figure 10:
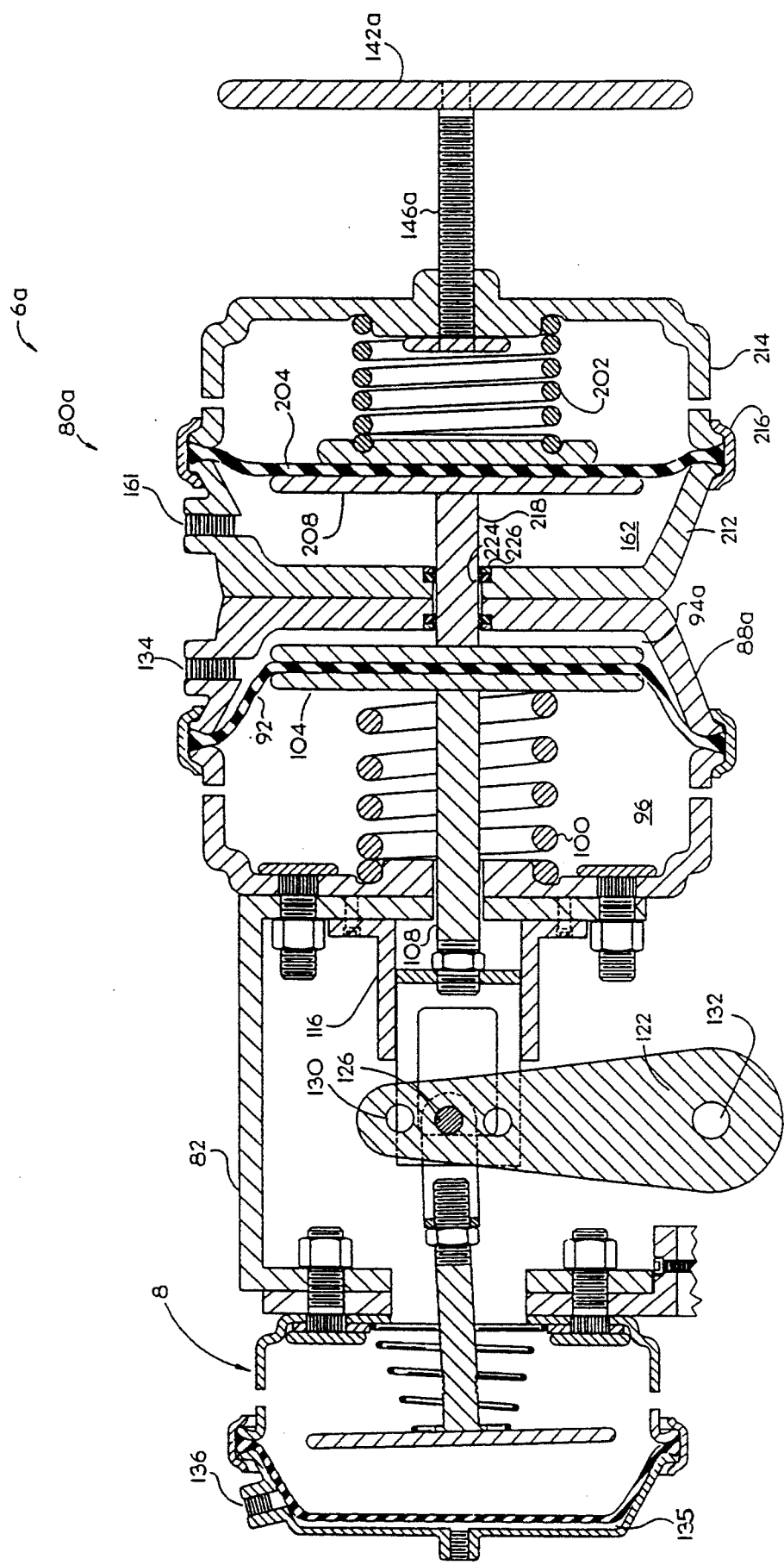
FIG. 10 shows the actuator of FIG. 7 with the service brake actuator in the brakes off position and the spring brake actuator in the parking brakes applied position.

With the improved brake system 2a of FIG. 7, a parking brake level braking force can be applied. To do so, parking brake control valve 176 is activated causing lines 184, 196, 72a, 163, 44, 46, 56, and 58 to be vented to atmosphere while the remaining lines are pressurized. This releases pressurized air from chambers 94a, 135 and allows chamber 162 to remain at atmospheric pressure. This condition of E&P actuator 80 is shown in FIG. 10. Thus, the force on slack adjuster 122 is due to the expanded spring 100 reduced by the force of spring 202.

Figure 11:
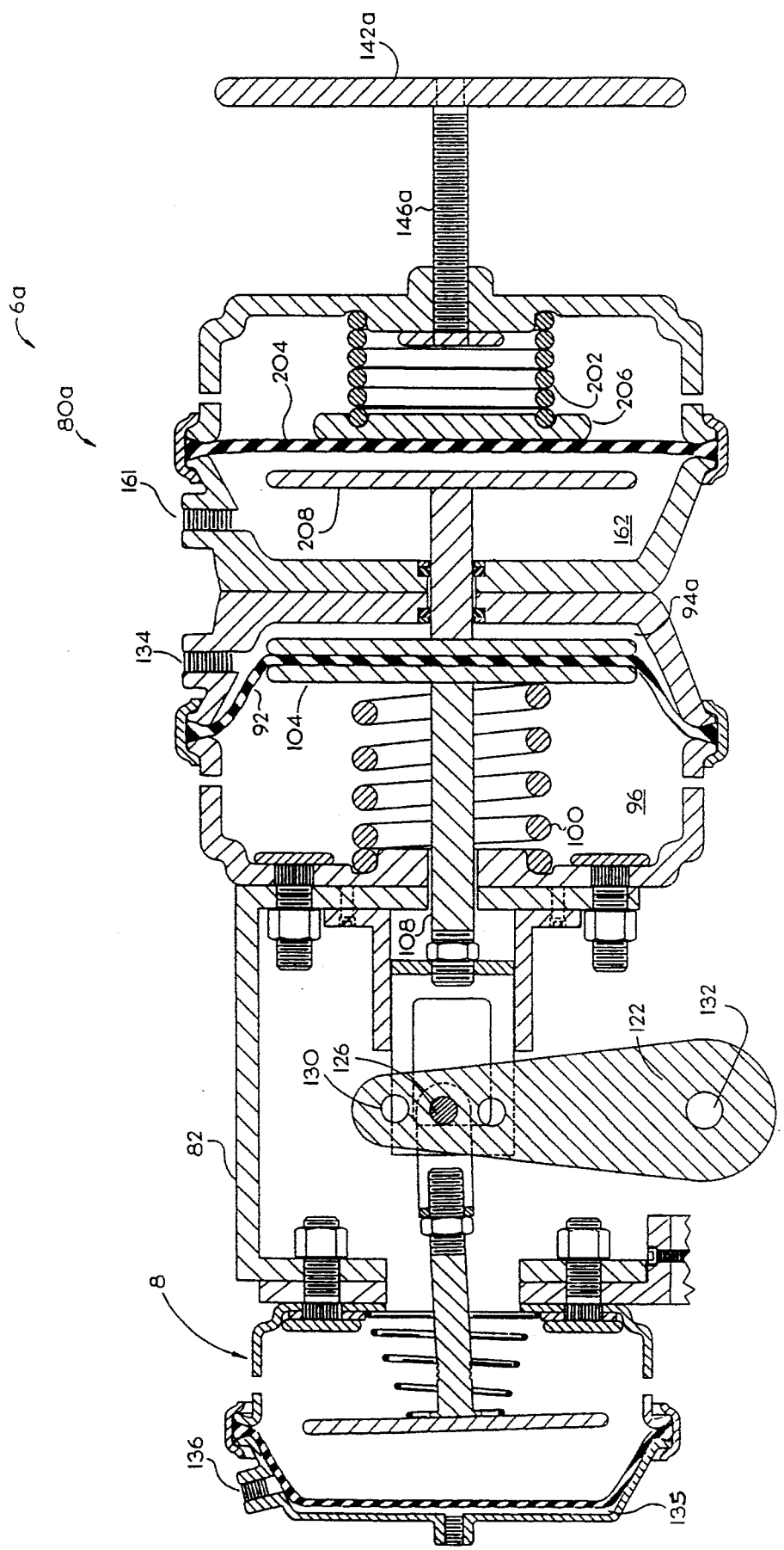
FIG. 11 shows the actuator of FIG. 7 with the service brake actuator in the brakes off position and the spring brake actuator in the emergency brakes applied position.

To apply brakes in an emergency, during which a braking force higher than that available when parking is needed, modulated E&P brake control valve 64 is actuated to vent line 72 and 168. Since line 184 is pressurized, line 72a is also vented to atmosphere. Note that check valve 198 keeps that portion 200 of line 196 between the check valve and line 184 at a high pressure value. Also, release exhaust valve 164, since control port 167 is at a low pressure level, couples inlet 166 with outlet 165 thus pressurizing line 163. This pressurization of chamber 162 and the depressurization of chambers 94, 135, shown in FIG. 11, permits spring 100 to exert its full force on slack adjuster 122 thus creating an additional braking force for the emergency situation over that exerted in FIG. 10. It should be noted that since valve 64 is a modulated valve, line 72 can be partially and/or slowly vented to atmosphere to allow the gradual application of the brakes for better control.

Figure 12:
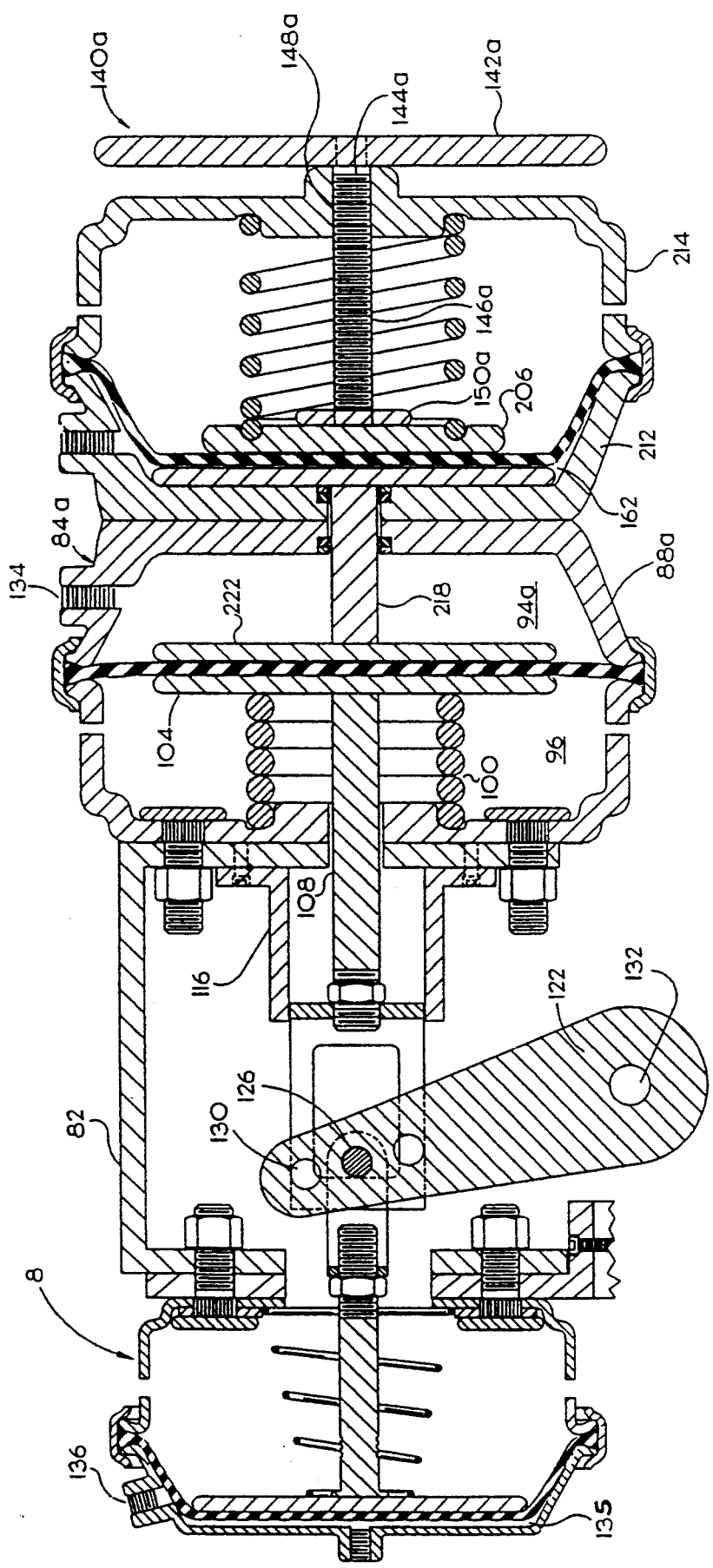
FIG. 12 shows the actuator of FIG. 7 with the application spring compressing assembly compressing the brake application spring thereby removing the brakes.
Figure 13:
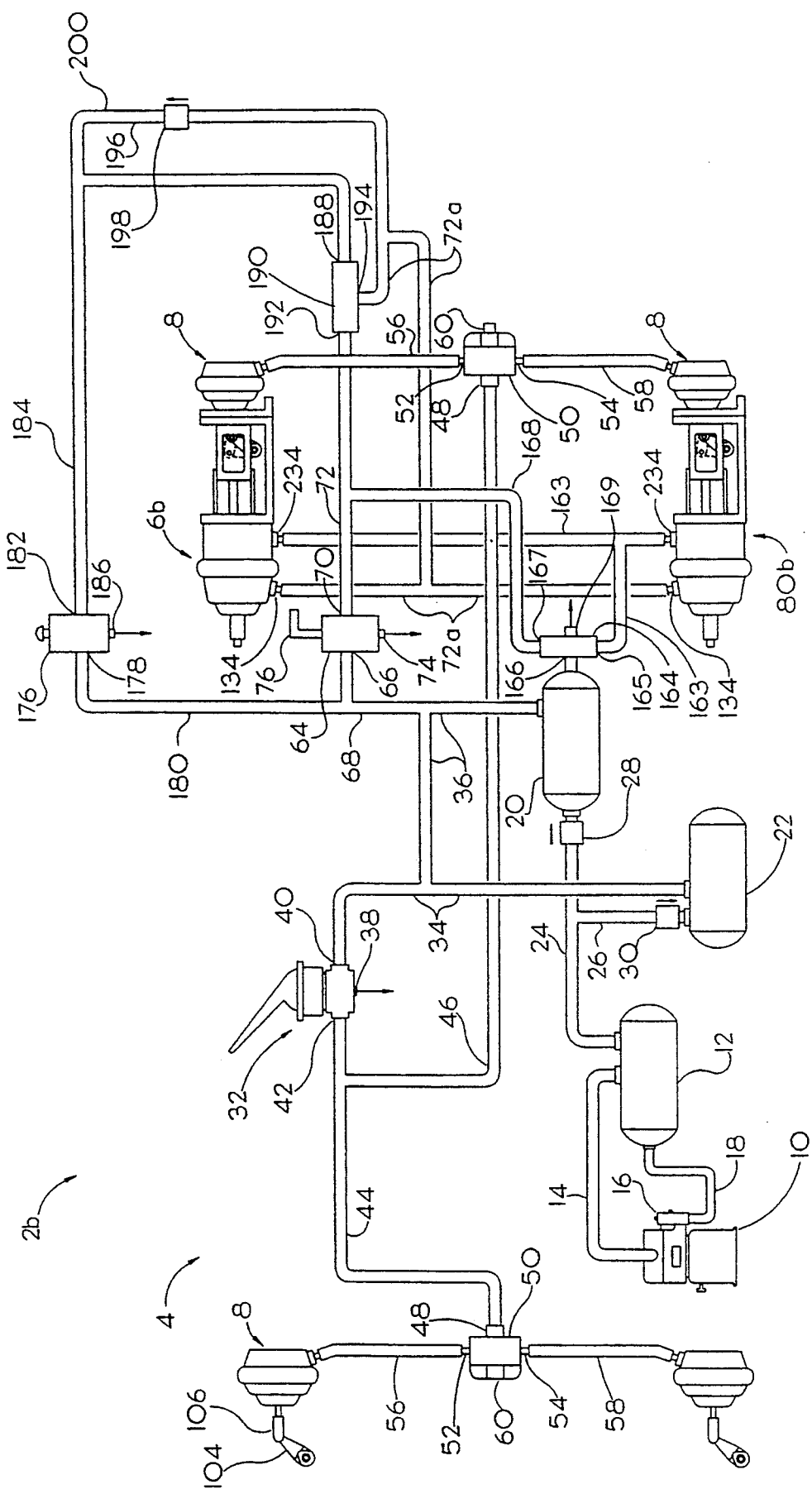
FIG. 13 is a schematic view similar to that of FIG. 1 in which the dual chamber brake actuator includes a compensating piston to provide emergency and parking braking force levels.

At times it is necessary to manually deactivate spring brake actuator 80a. This is done using an application spring recompression assembly 140a, similar to assembly 140, as shown in FIG. 12. Turning handle 142a causes plate 150a to press against plate 206 thus driving plate 208, shaft 218, plate 222 and finally diaphragm 92 against plate 104 to compress spring 100 thus releasing any force pulling on push rod 120 and slack adjuster 122.

Figure 14:
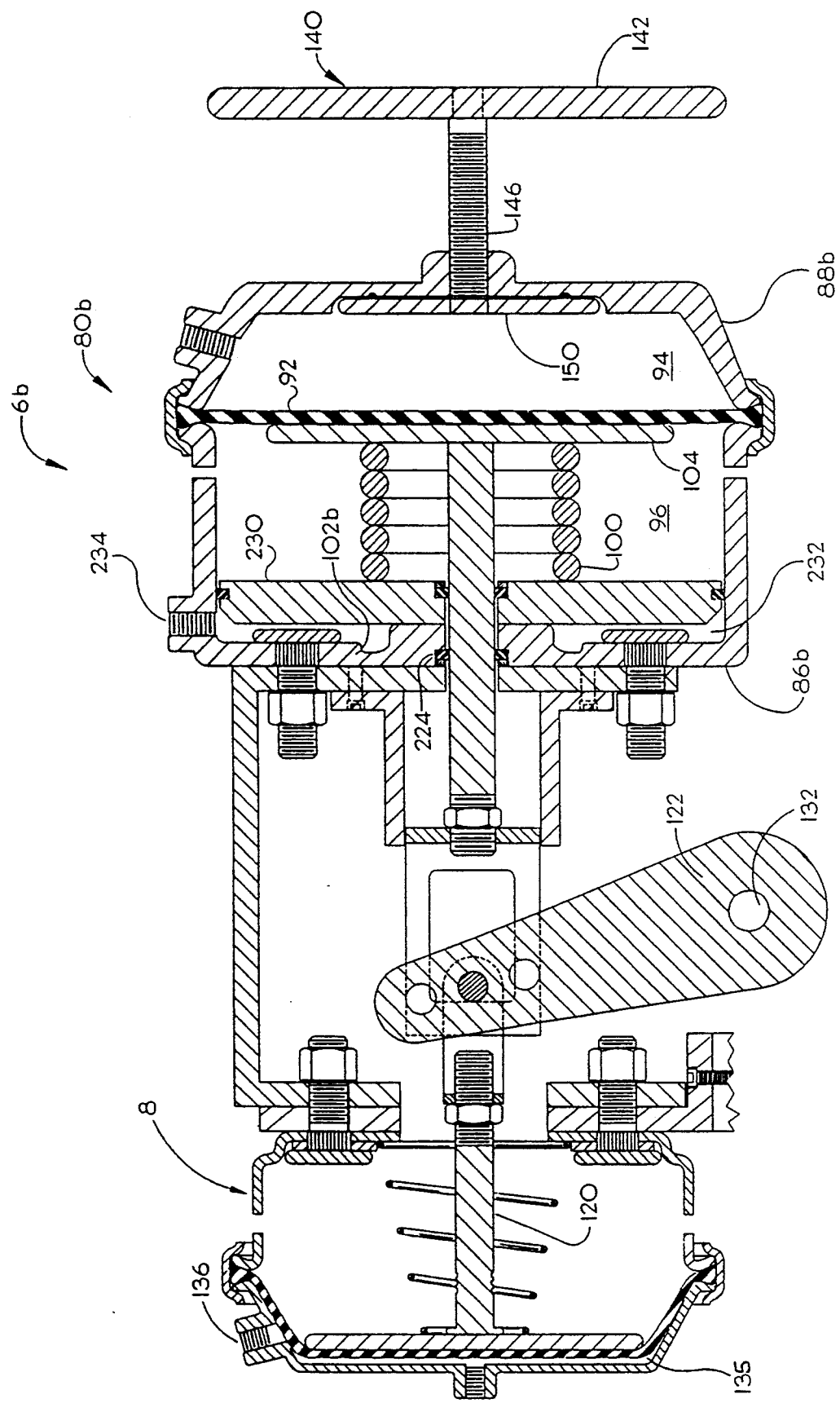
FIG. 14 shows the actuator of FIG. 13 with the service brake actuator in the brakes off position and the spring brake actuator in the brakes free position.
Figure 15:
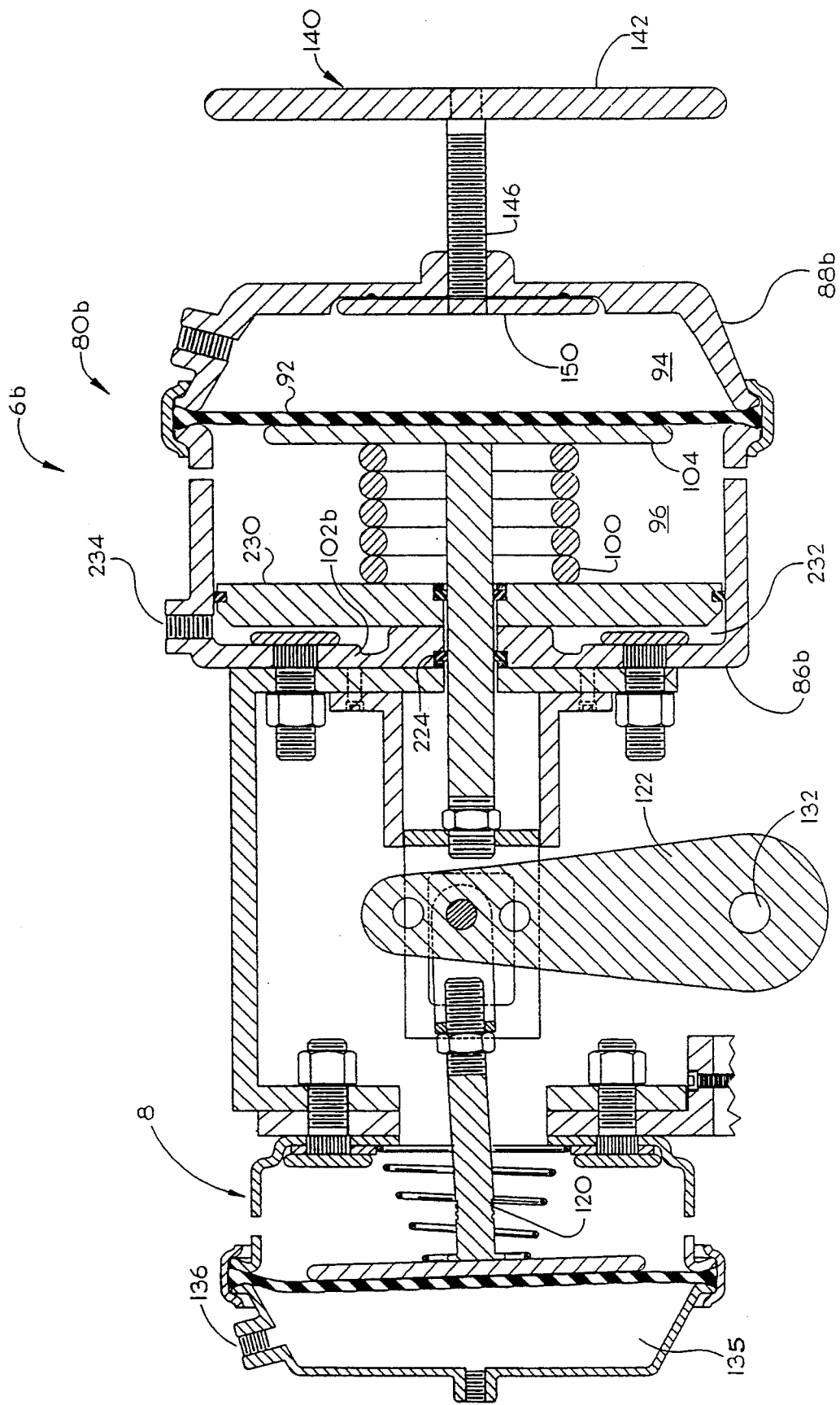
FIG. 15 shows the actuator of FIG. 14 with the service brake actuator in the brakes on position and the spring brake actuator in the brakes free position.
Figure 16:
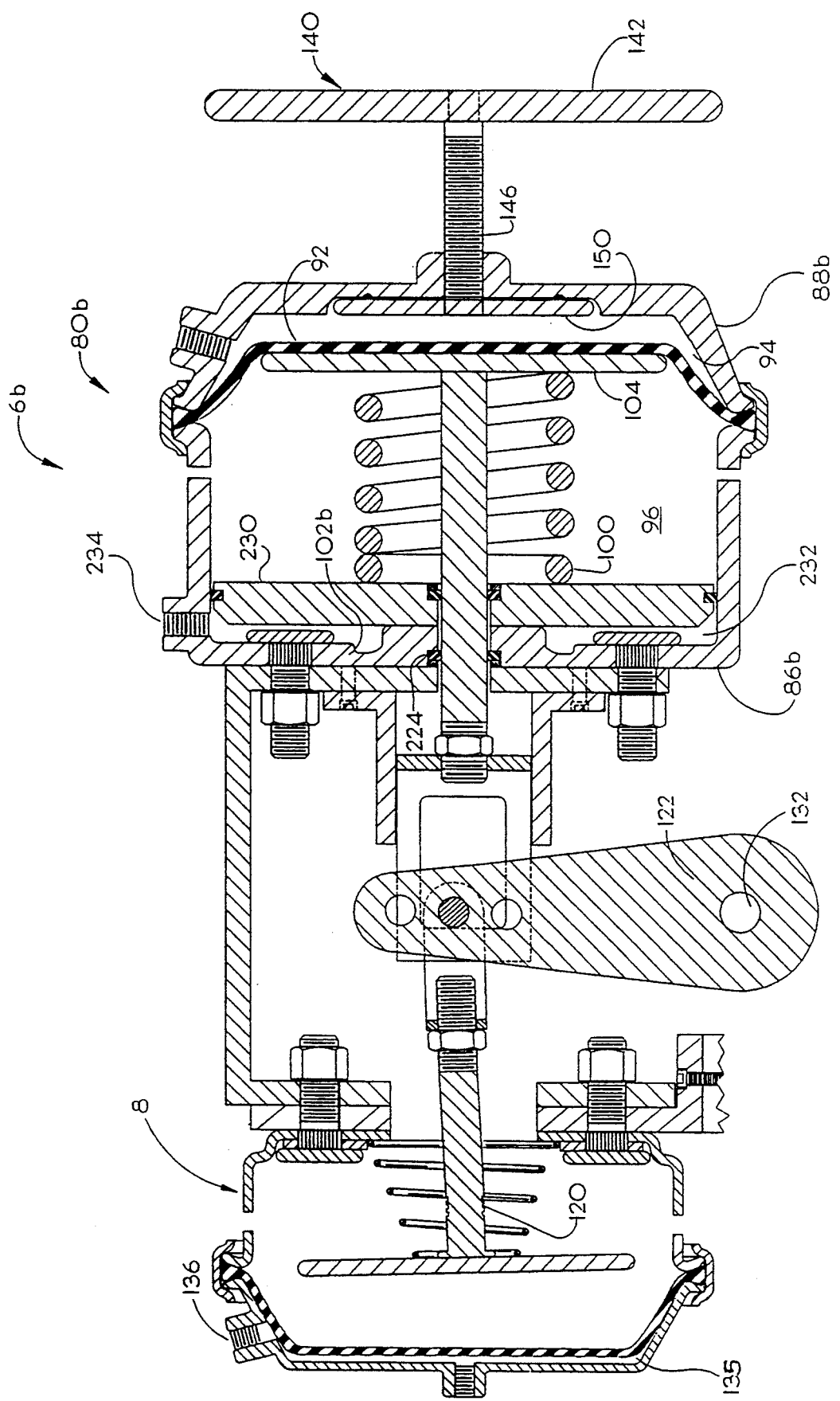
FIG. 16 shows the actuator of FIG. 14 with the service brake actuator in the brakes off position and the spring brakes actuator in the brakes applied position.

FIGS. 13–17 relate to an improved brake system 2b similar to brake system 2a but with a modification of multi-chamber brake actuator 6a. Multi-chamber brake actuator 6b is similar to actuator 6 of FIG. 2 but includes a compensating piston 230 housed within region 96 between base 102b of first part 86b and spring 100. Compensating piston 230 and first part 86b define a compensating chamber 232 which is coupled to line 163 by a port 234. Compensating piston 230 acts to recompress spring 100 after spring 100 has expanded when chamber 94 is vented to atmosphere. As discussed with reference to system 2a, FIG. 14 shows chambers 135, 232 vented to atmosphere and chamber 94 pressurized so that no brakes are applied. Applying the service brake by actuating pedal valve 32 pressurizes service brake chamber 135 to place multi-chamber brake actuator 6b in the condition of FIG. 15 with the service brake actuator 8 in the brakes on condition and spring brake actuator 80b in the brakes free position. In this situation, the force on slack adjuster 122 exerted totally by service brake actuator 8. FIG. 16 illustrates multi-chamber brake actuator 6b with service brake actuator 8 in the brakes off position and spring brake actuator 80b in the parking brake applied position with all chambers 135, 232 and 94 vented to atmosphere. In this case, the force on slack adjuster 122 is exerted by fully expanded spring 100 through brake actuation assembly 98.

Figure 17:
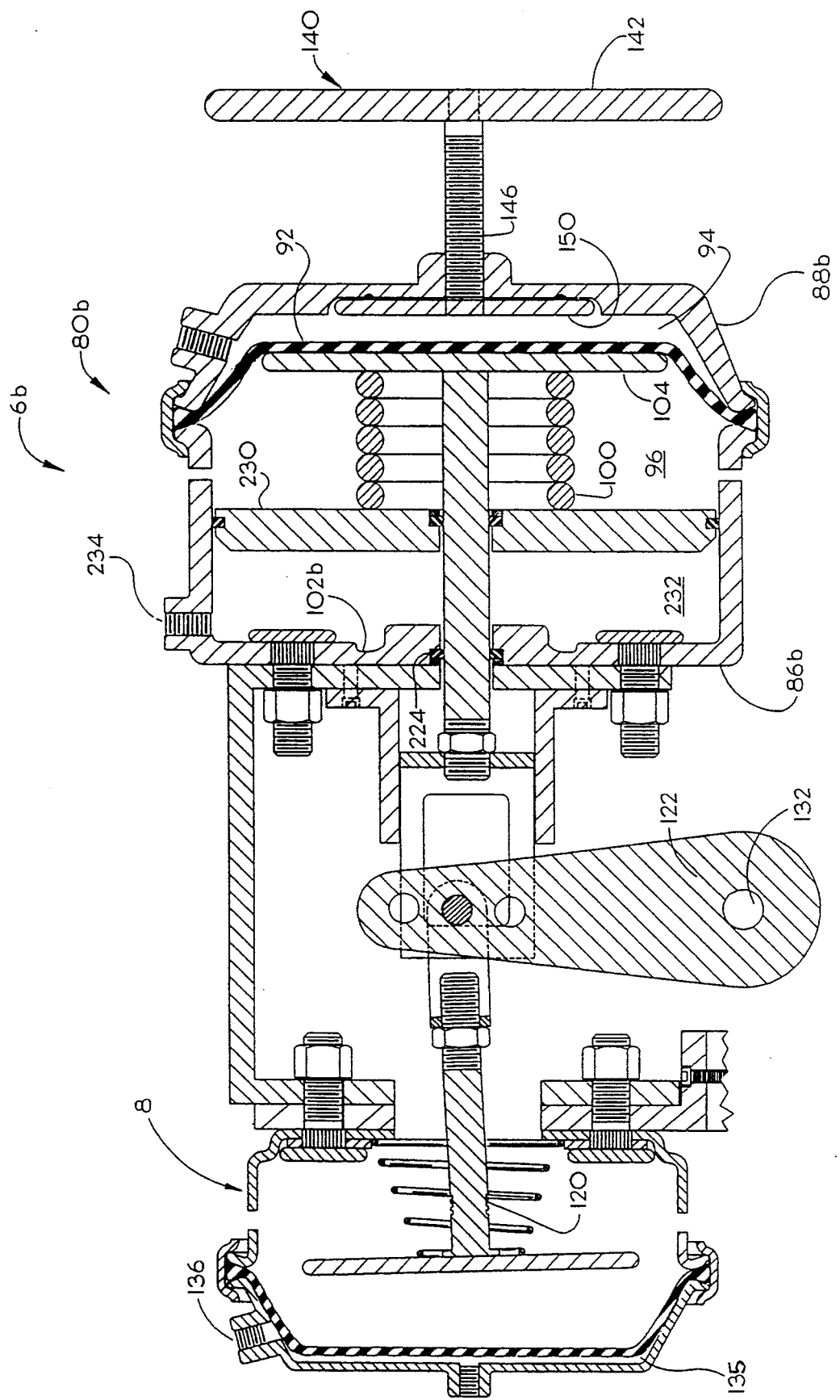
FIG. 17 illustrates the actuator of FIG. 14 with the service brake chamber in the brakes off position and the spring brake chamber in the emergency brakes applied position.

FIG. 17 shows multi-chamber brake actuator 6b with chambers 135 and 94 vented to atmosphere but compensation chamber 232 pressurized. Thus, service brake actuator 8 is in the brakes off position while spring brake actuator 80b is in the emergency brakes applied position. As can be seen by comparing FIGS. 16 and 17, movable pressure plate 104 and diaphragm 92 are in the same position in both cases. However, pressurizing compensating chamber 232 causes compensating piston 230 to recompress spring 100, thus increasing the force exerted by spring 100 on pressure plate 104, thus increasing the force exerted on slack adjuster 122.

Spring brake actuators 80a and 80b both permit the use of different levels of force for braking for emergency and parking brake situations. In one case, spring brake actuator 80a, the force of brake application spring 100 is counteracted or reduced to achieve a lower, parking brake force while in the other, spring brake actuator 80b, a compensating piston 230 is used to increase the force of spring 100. However, in both cases, E&P brake control valve 64 and parking brake control valve 176 are actuated to create the lower, parking brake force level and the higher, emergency brake force level.

The present invention is adapted for use with the existing, conventional slack adjusters. The invention could of course be used with specially constructed brake actuator elements as well. Also, spring brake actuator 80 could be hydraulically instead of pneumatically powered with appropriate changes in the controls and lines.

At FIG. 18 a dual axle air brake system 300 is shown to include service brake actuators 304 at the front axle and combination brake actuators 306 at the rear axle. Combination actuators 306 include a service brake chamber 308 and a spring brake chamber 310. Compressed air is supplied by a compressor 312 which feeds a supply or wet tank 314 with pressurized air from a line 316. The pressure within tank 314 is regulated by governor 318 coupled to tank 314 through a line 320. Wet tank 314 supplies pressurized air to tanks 362, 364a, 364b thorough lines 326, 328 and check valves 330, 332.

Governor 318 maintains wet tank 314 at, typically, 175 psi. A spring brake supply tank 362 is supplied with pressurized air at 175 psi while service brake supply tanks 364a, 364b are supplied with pressurized air at 100 psi through the use of a pressure reducing valve 366 along line 326. (It is preferred that the higher pressure in spring brake supply tank 362 be sufficiently high so that application of the spring brakes only supplies sufficient braking force to be effective as an emergency brake and not just a parking brake. Based upon the braking force available with conventional combination brake actuators, the higher pressure in tank 362 should be at least about 50% greater than the pressure in service brake supply tanks 364a and 364b. Pressurized air from service brake supply tanks 364a and 364b is supplied to service brake chambers 308 through the actuation of a service brake application valve (a single pedal valve) 368 which directs pressurized air, when actuated, through lines 370, 372 to quick release valves 344 and then to service brake chambers 308. Higher pressure (175 psi) air is supplied from spring brake supply tank 362 along a line 374, through an inlet 376 of a modulated spring brake control valve 378, thorough an outlet 380, through a line 381, and to the first entrance port 349 of two-way check valve 350. The exit port 355 of valve 350 is connected to spring brake chambers 310 through quick release valve 352 and lines 356. The second entrance port 353 is coupled to line 372 through line 351. The pressure of the air supplied to spring brake chambers 310 will be the greater of the pressures at first and second entrance ports 349, 353, due to the operation of two-way check valve 350.

During normal operation with all brakes off, service brake application valve 368, coupled to the brake pedal (not shown) in the vehicle (not shown), is released or deactuated so that the air pressure in lines 370, 372 is atmospheric by being vented through an exhaust port 392 of valve 368. Also, during normal running operation, with all brakes off, line 374 is maintained at the pressure of tank 362 (typically 175 psi). To apply the service brakes, the user actuates valve 368 which supplies air from tanks 364a and 364b at 100 psi to lines 370, 372 and 351; quick release valves 344 supply pressurized air to service brake chambers 308 so to apply the brakes at both the front and rear axles. Assuming valve 378 is deactuated so that line 381 is pressurized at 175 psi, two-way check valve 350 permits pressurized air in line 381 to pass through exit port 355, through quick release valve 352 through lines 356 and into spring brake chambers 310 so to keep the spring brakes fully deactuated. This prevents compounding of the forces created through service and spring brake chambers 308, 310 which could otherwise be generated by combination actuators 306.

Assuming service brake application valve 368 is deactuated, so that service brake chambers 308 and line 351 are vented to atmosphere, application of modulated spring brake control valve 378 vents part or all of the pressurized air within line 381 and thus within spring brake chambers 310. Doing so permits the actuator spring (not shown) associated with spring brake chamber 310 to apply the brakes at the rear axle in a controlled manner. Modulated spring brake control valve 378 may be of the type used as original equipment in European countries.

If one were to apply the service brakes, by actuating service brake application valve 368, as well as apply the spring brakes, by actuating modulated spring brake control valve 378, two-way check valve 350 will prevent excessive compounding. That is, while line 374 is fully pressurized with pressurized air from tank 362 at 175 psi (in the preferred embodiment), then air will be supplied to spring brake chambers 310 at this high pressure. By actuating valve 378 the pressure within line 374 can be reduced to a desired level, or simply brought down to the ambient atmospheric pressure. Once the pressure at first entrance port 349 drops below the pressure at second entrance port 353, two-way check valve 350 closes port 349 and permits pressurized air along line 372 to pass through exit port 355 and into spring brake chamber 310. Since the air pressure from tanks 364a and 364b is lower than the air pressure in tank 362, and since the actuator spring of spring brake chamber 310 is sized to be fully compressed by the higher pressure (175 psi in the preferred embodiment) air from tank 362, there is some compounding of braking force from both the service brake chamber and spring brake chamber. However, the amount of compounding which occurs should not be unacceptable.

Other modifications and variations can be made to the disclosed embodiments without departing from the subject of the invention as defined in the following claims. For example, instead of diaphragms 92, 204, pistons, such as ones similar to piston 230, can be used as well. All of the vehicle's brakes could be coupled to a spring brake actuator 80.

What is claimed is:

1. A method of supplying a higher pressure reserve air supply to a multi-chamber combination brake actuator comprising:
   connecting a multi-chamber combination brake actuator having a spring brake chamber and a service brake chamber to a pressurized air supply supplying pressurized air to said combination brake, through the steps of:
   connecting said multi-chamber combination brake actuator spring brake chamber to a first supply tank of pressurized air, with said spring brake chamber causing decreased braking force by said combination brake when pressurized air is supplied to said spring brake chamber; and,
   connecting said multi-chamber combination brake actuator service brake chamber to a second supply tank of pressurized air, with said service brake chamber providing increased braking force by said combination brake when pressurized air is supplied to said service brake chamber;
   connecting said first and second supply tanks together to form said pressurized air supply; and,
   reducing the pressure in said second supply tank relative to said first tank by connecting a pressure reducing valve between said first and second tanks.

2. The method according to claim 1, further comprising the step of:
   maintaining the pressure in said second supply tank relative to said first supply tank so that the pressure in said first supply tank is at least 50% higher than the pressure in said second supply tank.

* * * * *